(12) United States Patent
Kanda et al.

(10) Patent No.: US 7,706,023 B2
(45) Date of Patent: Apr. 27, 2010

(54) DATA PROCESSING METHOD, PRINTING APPARATUS, HOST APPARATUS, AND PRINTING SYSTEM

(75) Inventors: Hidehiko Kanda, Yokohama (JP); Norihiro Kawatoko, Kawasaki (JP); Toshiyuki Chikuma, Kawasaki (JP); Jiro Moriyama, Kawasaki (JP); Yuji Hamasaki, Kawasaki (JP); Atsushi Sakamoto, Kawasaki (JP); Aya Hayashi, Sendai (JP)

(73) Assignee: Canon Kabushiki Kaisha, Tokyo (JP)

( * ) Notice: Subject to any disclaimer, the term of this patent is extended or adjusted under 35 U.S.C. 154(b) by 603 days.

(21) Appl. No.: 11/473,050

(22) Filed: Jun. 23, 2006

(65) Prior Publication Data

US 2007/0008561 A1 Jan. 11, 2007

(30) Foreign Application Priority Data

Jun. 30, 2005 (JP) .............................. 2005-193078

(51) Int. Cl.
*H04N 1/60* (2006.01)
*H04N 1/46* (2006.01)
*H04M 1/40* (2006.01)

(52) U.S. Cl. ....................... 358/3.01; 358/1.9; 358/502; 358/505

(58) Field of Classification Search ................... 358/1.9, 358/3.01, 505, 502
See application file for complete search history.

(56) References Cited

U.S. PATENT DOCUMENTS

| 6,118,457 | A  | * | 9/2000  | Ohtsuka et al. ............. 345/620 |
| 6,120,129 | A  |   | 9/2000  | Iwasaki et al. |
| 6,260,938 | B1 |   | 7/2001  | Ohtsuka et al. |
| 6,315,391 | B1 | * | 11/2001 | Kanematsu .................. 347/43 |
| 6,830,313 | B2 |   | 12/2004 | Moriyama et al. |
| 6,857,718 | B2 |   | 2/2005  | Moriyama et al. |
| 2005/0122377 | A1 | * | 6/2005 | Mizutani et al. .............. 347/41 |

FOREIGN PATENT DOCUMENTS

| JP | 6-143618  | 5/1994 |
| JP | 10-175333 | 6/1998 |
| JP | 3229526   | 9/2001 |

* cited by examiner

*Primary Examiner*—Benny Q Tieu
*Assistant Examiner*—Ngon Nguyen
(74) *Attorney, Agent, or Firm*—Fitzpatrick, Cella, Harper & Scinto

(57) ABSTRACT

A data processing method, printing apparatus, host apparatus, and printing system are capable of reducing the data transfer rate from the host apparatus to the printing apparatus, suppressing density unevenness, and reducing the cost of the apparatus.

9 Claims, 32 Drawing Sheets

PRINT SCANNING DESIGNATION INDEX a : FIRST PASS, THIRD PASS
b : SECOND PASS, FOURTH PASS

FIG. 3
| QUANTIZATION LEVEL | | PRINT SCANNING DESIGNATION INDEX | |
|---|---|---|---|
| A → | 0 | 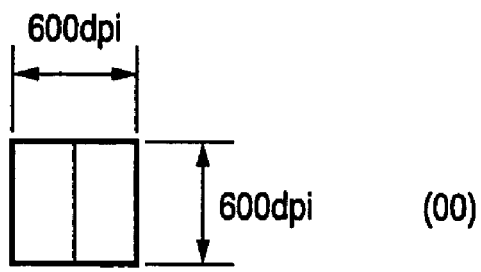 | (00) |
| B → | 1 |  | (01) |
| C → | 1 |  | (10) |
| D → | 2 |  | (11) |
 PRINT DOT DATA 1100011110010010
(MASK A)

0011100001101101
(MASK B)

UPPER

LOWER

BINARY IMAGE DATA 1010110110010100
(MASK C)

0101001001101011
(MASK D)

FIG. 13A

|  | AREA OF MASK A | AREA OF MASK B |
|---|---|---|
| FIRST PASS | 0000000010010010 | 0000000000000000 |
| THIRD PASS | 0000010000000000 | 0000000001001000 |
| FIFTH PASS | 0000000000000000 | 0011100000000000 |

|  | AREA OF MASK C | AREA OF MASK D |
|---|---|---|
| SECOND PASS | 0010110010010000 | 0000000000000000 |
| FOURTH PASS | 0000000000000000 | 0100000000100011 |

FIG. 13B

|  | AREA OF MASK A | AREA OF MASK B |
|---|---|---|
| FIRST PASS | 00000111 | 00000000 |
| THIRD PASS | 00100000 | 00010100 |
| FIFTH PASS | 00000000 | 11100000 |

|  | AREA OF MASK C | AREA OF MASK D |
|---|---|---|
| SECOND PASS | 01110110 | 00000000 |
| FOURTH PASS | 00000000 | 10001011 |

FIG. 15

| SAMPLING MASK | SIGNAL VALUE |
|---|---|
| SAMPLING MASK INCLUDING MASKS A AND B WITH COMPLEMENTARY RELATIONSHIP | 0 |
| SAMPLING MASK INCLUDING MASKS C AND D WITH COMPLEMENTARY RELATIONSHIP | 1 |

FIG. 17
PRINT SCANNING DESIGNATION INDEX
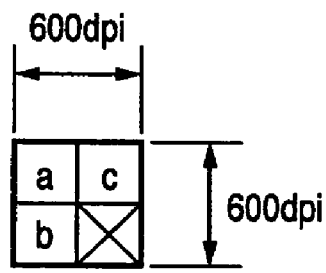
a : FIRST PASS, FOURTH PASS
b : SECOND PASS, FIFTH PASS
c : THIRD PASS, SIXTH PASS
UPPER
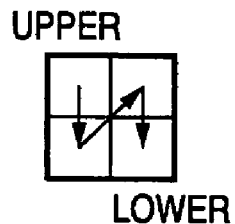
LOWER

FIG. 18
| | QUANTIZATION LEVEL | PRINT SCANNING DESIGNATION INDEX | 4-BIT EXPRESSION |
|---|---|---|---|
| A → | 0 | 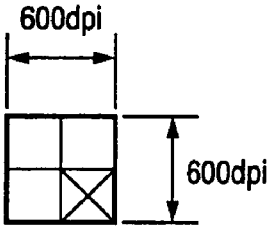 | (0000) |
| B → | 1 | 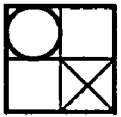 | (1000) |
| C → | 1 |  | (0100) |
| D → | 1 | 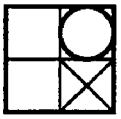 | (0010) |
| E → | 2 | 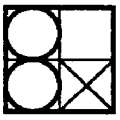 | (1100) |
| F → | 2 | 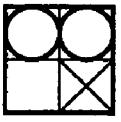 | (1010) |
| G → | 2 | 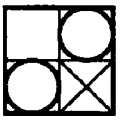 | (0110) |
| H → | 3 | 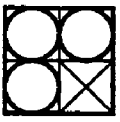 | (1110) |
 PRINT DOT DATA

FIG. 20
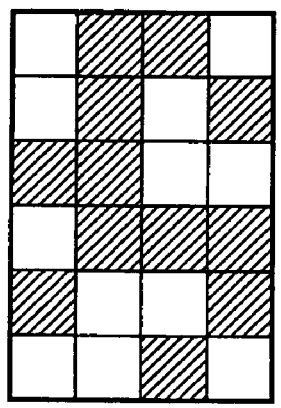
(MASK E)
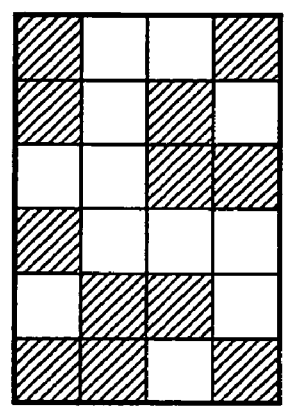
(MASK F)
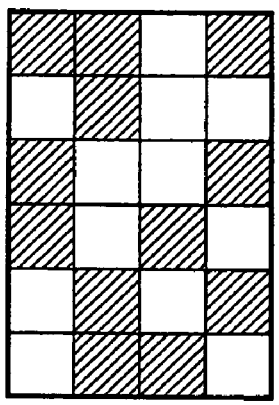
(MASK G)
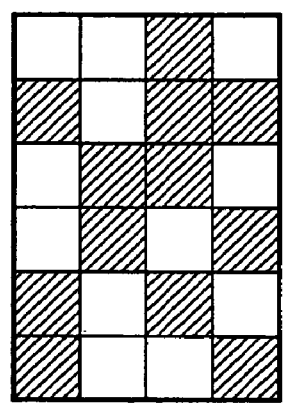
(MASK H)
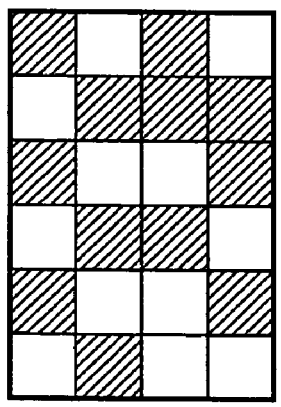
(MASK I)
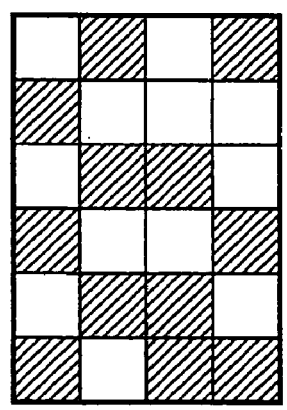
(MASK J)

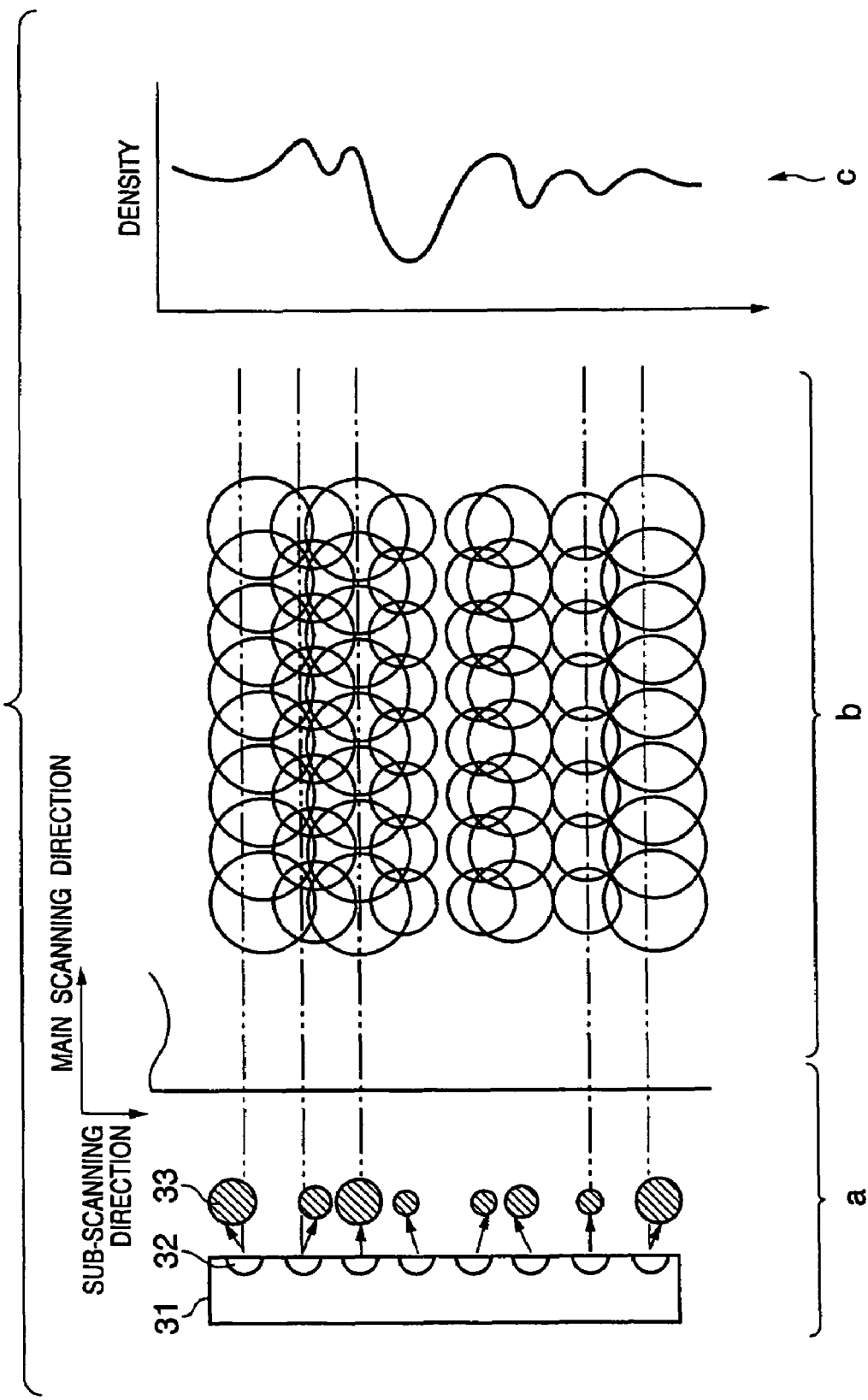

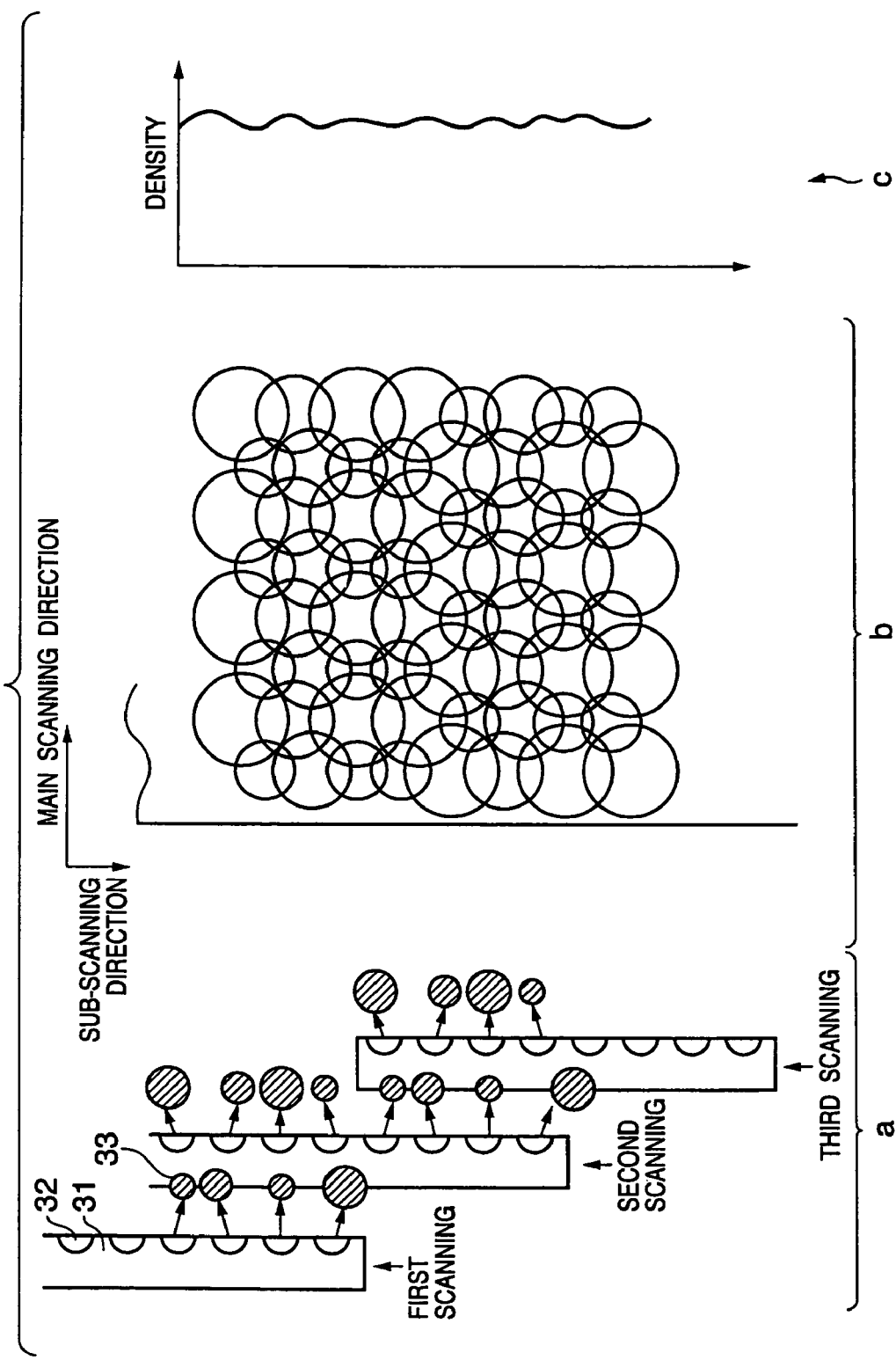

FIG. 30

◯ PRINT DOT DATA

| | QUANTIZATION LEVEL | PRINT SCANNING DESIGNATION INDEX | |
|---|---|---|---|
| | | DATA1 600dpi × 600dpi | DATA2 600dpi × 600dpi |
| A → | 0 | (00) ☐☐ | (00) ☐☐ |
| B → | 1 | (01) ☐◯ | (00) ☐☐ |
| C → | 1 | (10) ◯☐ | (00) ☐☐ |
| D → | 2 | (01) ☐◯ | (01) ☐◯ |
| E → | 2 | (10) ◯☐ | (01) ☐◯ |
| F → | 2 | (01) ☐◯ | (10) ◯☐ |
| G → | 2 | (10) ◯☐ | (10) ◯☐ |
| H → | 3 | (11) ◯◯ | (01) ☐◯ |
| I → | 3 | (11) ◯◯ | (10) ◯☐ |
| J → | 4 | (11) ◯◯ | (11) ◯◯ |

DATA PROCESSING METHOD, PRINTING APPARATUS, HOST APPARATUS, AND PRINTING SYSTEM

FIELD OF THE INVENTION

This invention relates to a data processing method, printing apparatus, host apparatus, and printing system and, more particularly, to a printing apparatus which has a printhead and executes printing by discharging ink by, e.g., an inkjet method, a host apparatus connected to the printing apparatus, a printing system including these apparatuses, and a data processing method applicable to the system.

BACKGROUND OF THE INVENTION

Conventionally, serial printing apparatuses which execute printing by using various printing methods in accordance with print data transferred from a host apparatus are widely used. Especially a printing apparatus employing a dot matrix method forms a desired printed image on a sheet-like printing medium by alternately repeating an operation of moving a carriage with a printhead capable of dot printing and an operation of conveying the printing medium in a direction perpendicular to the carriage moving direction. The carriage moving direction is called a main scanning direction, and the direction perpendicular to the main scanning direction is called a sub-scanning direction. A printhead according to this method is widely used in various fields because high-density printing at a relatively high speed can be achieved at a low cost.

In such a serial printing apparatus where a plurality of printing elements for dot printing are arrayed in the sub-scanning direction, it has been known that an unevenness in the printing density occurs because of, e.g., errors between the individual printing elements in the manufacture.

To suppress such density unevenness, in the conventional method, for example, every other elements of the plurality of arrayed printing elements are used for dot printing in the first carriage scanning. The printing medium is conveyed by almost ½ the normal conveyance amount. Next dot printing is done using printing elements that are unused in the first carriage scanning. Printing control is executed by repeating the above-described operations.

FIG. 23 is a perspective view showing the schematic arrangement of a printing apparatus having an inkjet printhead.

As shown in FIG. 23, a carriage 106 that reciprocally moves in the X direction has four ink cartridges 101. The ink cartridges 101 includes ink tanks storing four color inks, i.e., black (K), cyan (C), magenta (M), and yellow (Y) inks and a printhead 102.

FIG. 24 is a view showing ink orifices arrayed on the printhead 102.

FIG. 24 shows the ink orifices of the printhead viewed from the Z direction in FIG. 23. Referring to FIG. 24, reference numeral 201 denotes a plurality of orifices arrayed on the printhead 102. FIG. 24 shows an example with eight ink orifices (n1 to n8) for the descriptive convenience. Four arrays of ink orifices are arranged on the printhead 102 in correspondence with the number of ink colors. FIG. 24 illustrates only one array of orifices.

Referring back to FIG. 23, a conveyance roller 103 rotates in the direction of an arrow in FIG. 23 while holding a printing paper sheet P together with an auxiliary roller 104, thereby conveying the printing paper sheet P in the Y direction as needed. Feed rollers 105 feed the printing paper sheet and also serve to hold the printing paper sheet P, like the conveyance roller 103 and auxiliary roller 104. The carriage 106 stands by in a home position (h) indicated by the dotted line in FIG. 23 when no print operation is executed, or a printhead recovery operation is executed.

Upon receiving a print start instruction, the carriage 106 that is located in the home position before the start of printing executes printing by discharging an ink from the plurality of orifices 201 on the printhead 102 while moving in the X direction. When printing corresponding to print data until the end of the paper sheet is ended, the carriage 106 returns to the home position and executes printing in the X direction again.

To print, e.g., an image, various factors such as color development, tonality, and uniformity have to be considered. Especially for uniformity, a small variation between nozzles in the manufacturing process of the printhead influences the discharge amount or discharge direction of ink from each nozzle in printing. This finally causes a density unevenness of a printed image and degrades the image quality, as is known.

A detailed example will be described with reference to FIGS. 25 and 26.

FIG. 25 is a view showing a state wherein printing is executed by normally discharging ink from a printhead.

FIG. 26 is a view showing a state wherein ink is not normally discharged from a printhead. This means that a printing failure occurs, resulting in density unevenness. Referring to FIGS. 25 and 26, reference numeral 31 denotes a printhead having eight nozzles; 32, nozzles which discharge ink; and 33, ink droplets discharged from the nozzles 32.

Referring to FIG. 25, a indicates that ink droplets are ideally discharged in the same discharge amount in the same direction. If discharge is done in this way, dots with the same size stick to a printing medium such as a printing paper sheet, as indicated by b in FIG. 25. Referring to FIG. 25, c indicates a change in density of print dots in a direction along the nozzle array. When normal ink discharge is done, an overall uniform image without density unevenness can be obtained, as indicated by c in FIG. 25.

Actually, however, the ink discharge characteristic varies between nozzles, as described above. Hence, if printing is done, the sizes or discharge directions of ink droplets discharged from the nozzles vary, as indicated by a in FIG. 26. The discharged ink droplets stick to a printing medium as indicated by b in FIG. 26. According to b in FIG. 26, a blank part that cannot satisfy an area factor of 100% is periodically formed in the main scanning direction, or conversely, the dots overlap more than necessary. In addition, a white stripe is formed at the center of b in FIG. 26. The aggregation of dots sticking to the printing medium in this way exhibits a density distribution indicated by c in FIG. 26 in the nozzle array direction. Such a density distribution is eventually perceived by human eyes as a density unevenness. A stripe generated by a variation in printing medium conveyance amount may also be noticeable.

Japanese Patent Publication Laid-Open No. 6-143618 proposes the following method as a measure to prevent the density unevenness. This method will be described briefly with reference to FIGS. 26 and 27.

FIG. 27 is a view showing a state wherein printing is executed by multi-pass printing.

According to this method, the printhead 31 is scanned three times to complete a printing region shown in FIGS. 26 and 27, as indicated by, e.g., a in FIG. 27. A region of four pixels in the sub-scanning direction, which is ½ the print width of the printhead 31, is completed by two passes. In this case, the eight nozzles of the printhead are divided into two groups: the four upper nozzles and the four lower nozzles. Dots printed by one nozzle in one scanning are obtained by sampling predetermined image data to about ½ in accordance with a predetermined image data sequence. Dots are printed by using the ½ remaining image data in the second scanning, thereby completing the 4-pixel region in the sub-scanning direction.

The above-described printing method is multi-pass printing.

When this printing method is used, even when a printhead with a variation in ink discharge characteristic between the nozzles, as shown in FIG. 26, is used, the influence of the characteristic unique to each nozzles on the printed image can be reduced by half. Hence, a printed image as indicated by b in FIG. 27 is obtained. As a result, the black or white string indicated by b in FIG. 26 is relatively unnoticeable. Hence, the density unevenness is also considerably relaxed as indicated by c in FIG. 27 as compared to c in FIG. 26.

In this multi-pass printing, image data is divided for the first scanning and second scanning in accordance with a predetermined sequence so that the data can complement each other. For this, an image data sequence that forms a staggered pattern every other pixel in the vertical and horizontal directions, as shown in FIGS. 28A to 28C, is generally used.

In the unit printing region (in this example, the 4-pixel region in the sub-scanning direction), printing is completed by the first scanning to print a staggered pattern and the second scanning to print an inverted (complementary) staggered pattern. FIGS. 28A to 28C show how to print a predetermined region by using staggered and inverted staggered sampling patterns (mask patterns).

Referring to FIGS. 28A to 28C, in the first scanning, the staggered sampling pattern is printed by using the four lower nozzles of the printhead 31, as shown in FIG. 28A. In the second scanning, the printing medium is conveyed by a length corresponding to four pixels (½ the print width of the printhead), and the inverted (complementary) staggered sampling pattern is printed, as shown in FIG. 28B. In the third scanning, the printing medium is conveyed by a length corresponding to four pixels (½ the print width of the printhead) again, and the staggered sampling pattern is printed again, as shown in FIG. 28C. In this way, conveyance for four pixels and printing of the staggered and inverted (complementary) staggered sampling patterns are sequentially alternately executed, thereby completing the 4-pixel printing region in the sub-scanning direction by every scanning of the printhead.

Japanese Patent Publication Laid-Open No. 10-175333 also discloses mask patterns applicable to such a multi-pass printing. Especially, Japanese Patent Publication Laid-Open No. 10-175333 describes an arrangement in which a mask pattern is transferred to a printer and registered in it prior to printing. Then, multi-pass printing is performed while applying the mask.

In the above-described prior arts, however, print data is transferred from the host to the printing apparatus on the assumption that printing corresponding to the entire region of one scanning of the printhead is achieved by one scanning of the printhead. On the other hand, the printing apparatus holds the print data so that desired dot printing is executed by a plurality of number of times of scanning, e.g., two scanning operations in the above-described example.

In other words, print data that is not used for printing by one scanning is transferred from the host to the printing apparatus. Especially, a printing apparatus that must execute high-resolution printing requires a large amount of print data for it, and a high speed print data transfer is necessary. Even a printing apparatus on the receiving side must have a high-performance interface to cope with such a high speed transfer and also a large capacity of print buffer to store a large amount of print data. These factors increase the production cost of the apparatuses.

To solve this problem, a technique has been proposed in which print data to be used for each pass printing is transferred from a host to a printing apparatus that executes multi-pass printing. Particularly, to enable a printer and a host to use an interface with a low data transfer rate, Japanese Patent No. 3,229,526 describes a technique of compressing print data to be used for each pass printing and transferring the data to a printing apparatus. According to Japanese Patent No. 3,229,526, all of mask patterns (2×2 staggered patterns) to be applied to multi-pass printing are stored in a memory of the printing apparatus in advance.

However, in a case where a memory capacity integrated with a printing apparatus is small, all of mask patterns necessary for multi-pass printing cannot always be stored in the printing apparatus in advance. More specifically, according to Japanese Patent No. 3,229,526, since a mask pattern (staggered pattern) common to each scan is used, an amount of data for the mask pattern is rather small. For this reason, it is possible to store all of mask patterns (staggered patterns) in a printing apparatus. However, if a printing apparatus changes a mask pattern for each scan, a total amount of mask patterns is huge. Therefore, it is not possible to store all of mask patterns into a small capacity memory. Hence, a multi-pass printing technique capable of allowing even a printing apparatus with a small memory capacity to execute high-resolution high-quality printing at a high speed has been demanded.

SUMMARY OF THE INVENTION

Accordingly, the present invention is conceived as a response to the above-described disadvantages of the conventional art.

For example, a data processing method, printing apparatus, host apparatus, and printing system according to the present invention are capable of reducing the data transfer amount from the host apparatus to the printing apparatus, suppressing density unevenness, and reducing the cost of the apparatus.

According to one aspect of the present invention, preferably, there is provided a method of processing data supplied from a host to a printing apparatus which prints a plurality of unit areas on a printing medium by scanning a printhead over each of the plurality of unit areas plural number of times, comprising: a preparation step of, for each of the plurality of unit areas, preparing a mask pattern corresponding to each scan; a generation step of generating thinned image data by applying the mask pattern corresponding to each scan prepared at the preparation step to image data, wherein one set of mask patterns used for generating thinned image data corresponding to a plurality of unit areas printed by one scan differ from another set of mask patterns used for generating thinned image data corresponding to a plurality of unit areas printed by another scan; a compression step of compressing the thinned image data corresponding to each scan generated at the generation step, on the basis of the mask pattern which has been used for generating the thinned image data; a transfer step of transferring, from the host to the printing apparatus, the compressed image data compressed at the compression step and information on the mask pattern which has been used for the compression; and a decompression step of decompressing, on the basis of the transferred information on the mask pattern, the compressed image data transferred at the transfer step.

According to another aspect of the present invention, preferably, there is provided a method of processing data supplied from a host to a printing apparatus which prints a plurality of unit areas on a printing medium by scanning a printhead over each of the plurality of unit areas plural number of times, comprising: a preparation step of, for each of the plurality of unit areas, preparing a mask pattern corresponding to each scan, wherein different mask patterns are prepared for different unit areas; a generation step of generating thinned image data corresponding to each scan by applying the mask pattern corresponding to each scan prepared at the preparation step to image data; a compression step of compressing the thinned image data corresponding to each scan generated at the generation step, on the basis of the mask pattern which has been used for generating the thinned image data; a transfer step of transferring, from the host to the printing apparatus, the compressed image data compressed at the compression step and information on the mask pattern which has been used for the compression; and a decompression step of decompressing, on the basis of the transferred information on the mask pattern, the compressed image data transferred at the transfer step.

The present invention is particularly advantageous since the amount of data transferred from the host apparatus to the printing apparatus can be decreased. In addition, density unevenness is suppressed by executing multi-pass printing so that high-quality image printing can be executed.

When the data transfer amount can be decreased, the transfer amount per unit time, i.e., the transfer rate can be low. This makes the use of an inexpensive communication interface for low-speed transfer possible, thus reducing the cost.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is an explanatory view of the relationship between a quantization level and the print scanning designation index according to the first embodiment of the present invention;

FIGS. 13A and 13B are views for explaining the relationship between thinned image data to be used for scan printing and compressed image data of the image data according to the second embodiment of the present invention;

FIG. 15 is a view showing the relationship between the mask patterns and signal values corresponding to the mask patterns according to the second embodiment of the present invention;

FIG. 17 is a view showing the structure of a print scanning designation index used in the fourth embodiment of the present invention;

FIG. 18 is a view showing the relationship between a quantization level and the print scanning designation index according to the fourth embodiment of the present invention;

FIG. 20 is a view showing mask patterns to be used in 6-pass printing according to the fourth embodiment of the present invention;

FIG. 26 is a view for explaining a state wherein density unevenness occurs upon printing by the inkjet printhead;

FIG. 27 is a view for explaining density unevenness suppression by a multi-pass printing method;

FIG. 30 is a view showing how to allot and arrange image data quantized to five values in the print scanning designation index;

DETAILED DESCRIPTION OF THE PREFERRED EMBODIMENTS

Preferred embodiments of the present invention will now be described in detail in accordance with the accompanying drawings.

Constituent elements described in the following embodiments are merely illustrative, and the scope of the invention is not limited to them.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similar to the definition of "print" described above. That is, "ink" includes a liquid which, when applied onto a print medium, can form images, figures, patterns, and the like, can process the print medium, and can process ink (e.g., can solidify or insolubilize a coloring agent contained in ink applied to the print medium).

Furthermore, unless otherwise stated, the term "nozzle" generally means a set of a discharge orifice, a liquid channel connected to the orifice and an element to generate energy utilized for ink discharge.

Figure 1:
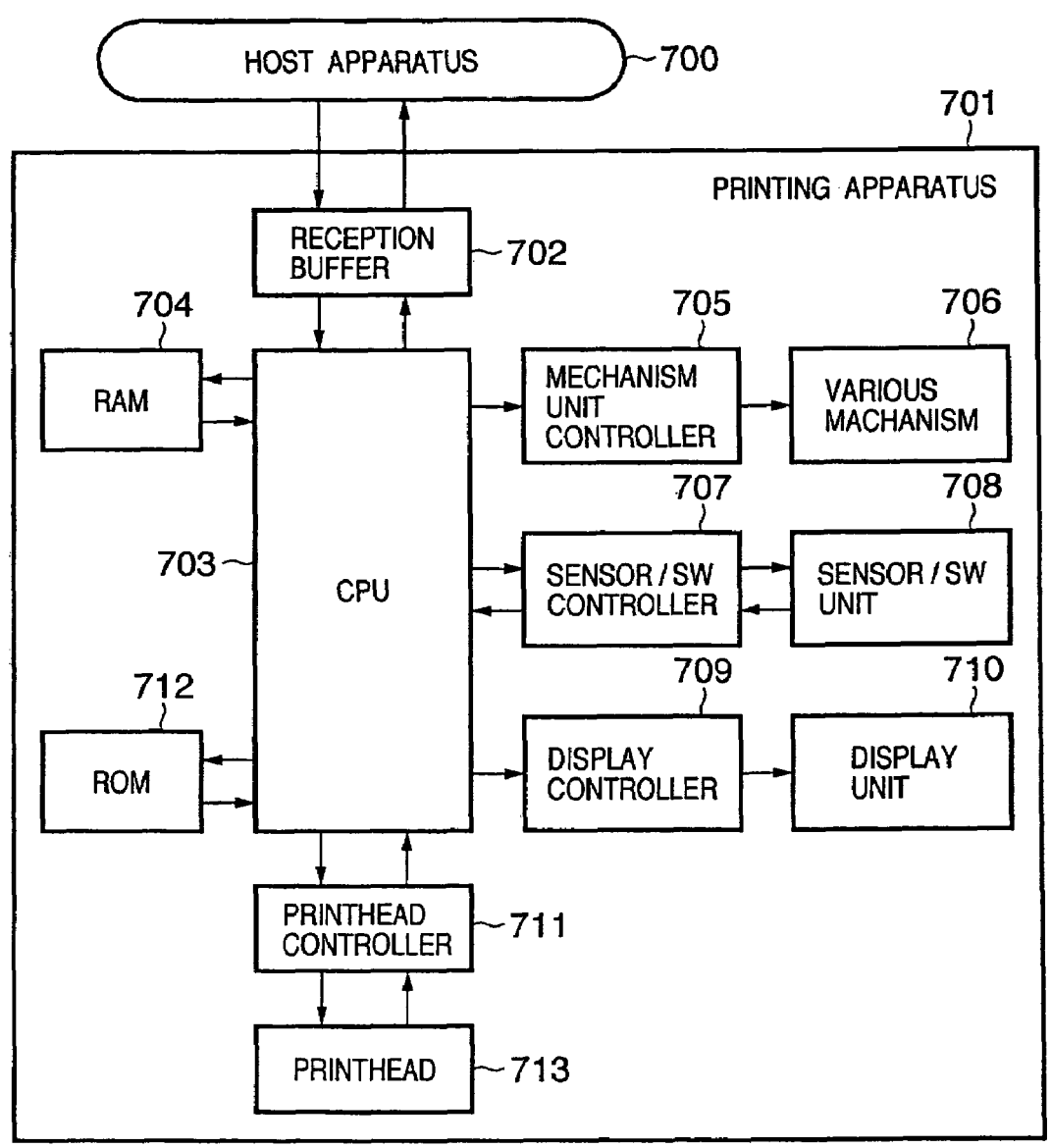
FIG. 1 is a block diagram showing the control configuration of an inkjet printing apparatus according to a typical embodiment of the present invention.

FIG. 1 is a block diagram showing the control configuration of an inkjet printing apparatus according to a typical embodiment of the present invention. The schematic outer arrangement of the inkjet printing apparatus is the same as that shown in FIG. 23.

Referring to FIG. 1, data of a text or image (hereinafter referred to as "image data") to be printed is transmitted from a host apparatus 700 to a printing apparatus 701 and stored in a reception buffer 702 of the printing apparatus 702. As described later, the host apparatus performs image data compression, and the compressed image data is transferred from the host apparatus. Thus, the compressed image data is stored in the reception buffer 702 of the printing apparatus 701. Also, information on mask patterns used for multi-pass printing is transferred from the host apparatus. In addition, data to confirm whether data is correctly transferred and data to indicate the operation state of the printing apparatus 701 are transmitted from the printing apparatus 701 to the host apparatus 700.

The data stored in the reception buffer 702 is processed under the management of a CPU 703 into data to be used for printing by scanning a printhead 713, and stored in the print buffer in a RAM 704. More specifically, the CPU 703 decompresses the received compressed image data, based on the received information on the mask patterns, and stores the decompressed image data into the print buffer of the RAM 704. The data in the print buffer is transferred to the printhead 713 by a printhead controller 711. An image is printed on the basis of the image data by controlling the printhead 713. The printhead controller 711 detects, e.g., temperature information indicating the state of the printhead 102 and sends the information to the CPU 703. The processed information is sent back to the printhead controller 711 so as to control the printhead 102.

A mechanism controller 705 drives and controls various mechanism 706 including a carriage motor and line feed motor on the basis of instructions from the CPU 703.

A sensor/SW controller 707 sends, to the CPU 703, a signal from a sensor/SW unit 708 including various kinds of sensors and SWs (switches).

A display controller 709 is configured to control a display unit 710 including the LED or LCD of a display panel on the basis of instructions from the CPU 703.

Several embodiments will now be described in which the printing apparatus with the above-described arrangement is used as a common embodiment.

First Embodiment

Figure 2:
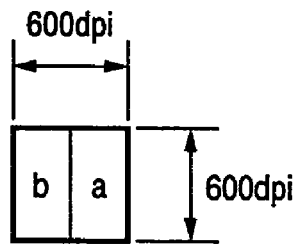
FIG. 2 is a view showing the structure of a print scanning designation index used in the first embodiment of the present invention.

FIG. 2 is a view showing an index that designates print scanning for quantized data with a resolution of 600×600 dpi, which is obtained by causing the host apparatus to quantize image data of each pixel to three values.

As shown in FIG. 2, a pixel with the resolution of 600×600 dpi is divided into 2-bit data, i.e., two sub-pixels a and b. The quantized image data are allotted and arranged in a and b. Data arranged in a is printed in odd-numbered passes, i.e., first and third passes. Data arranged in b is printed in even-numbered passes, i.e., second and fourth passes.

FIG. 3 is a view showing how to allot and arrange quantized image data in accordance with the print scanning designation index shown in FIG. 2.

For image data quantized to three values, i.e., quantization levels 0, 1, and 2, the number of print dots of quantization level 1 is one, and the number of print dots of quantization level 2 is two.

The number of print dots of quantization level 0 is zero, as indicated by A in FIG. 3. This can be expressed by two bits as (00). The number of print dots of quantization level 1 is one, as indicated by B and C in FIG. 3. This can be expressed by two bits as (01) of B and (10) of C in FIG. 3. The number of print dots of quantization level 2 is two, as indicated by D in FIG. 3. This can be expressed by two bits as (11).

Figure 4:
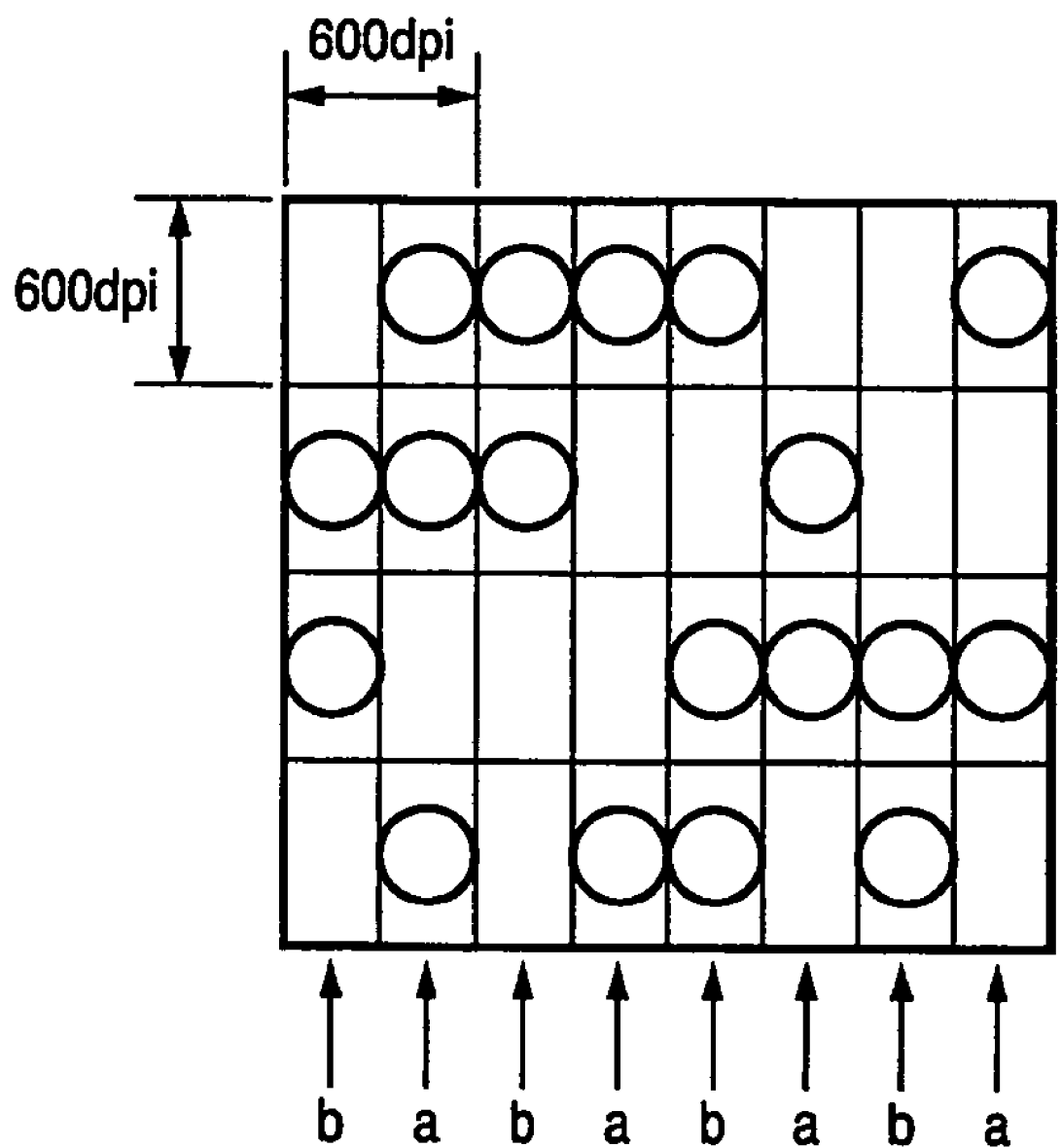
FIG. 4 is a view showing image data obtained by allotting quantized data in accordance with the print scanning designation index according to the first embodiment of the present invention.

FIG. 4 is a view showing image data containing 4×4 pixels of the resolution of 600×600 dpi, which is obtained by allotting quantized image data in accordance with the print scanning designation index according to the first embodiment.

Figure 5A:
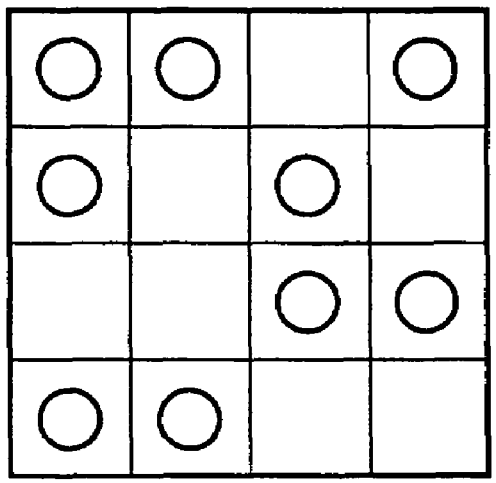
FIGS. 5A and 5B are views showing only image data to be used for each pass designated by the print scanning designation index according to the first embodiment of the present invention.
Figure 5B:
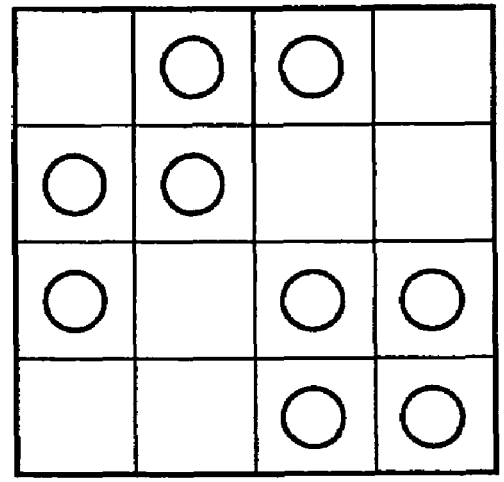

FIGS. 5A and 5B are views schematically showing passes in which printing is executed in multi-pass (multi-scan) printing.

FIG. 5A shows image data obtained by extracting, from the image data shown in FIG. 4, only image data to be used for printing in odd-numbered passes, i.e., the first and third passes corresponding to the sub-pixel a in FIG. 2. FIG. 5B shows image data obtained by extracting, from the image data shown in FIG. 4, only image data to be used for printing in even-numbered passes, i.e., the second and fourth passes corresponding to the sub-pixel b in FIG. 2.

FIGS. 6A to 6C and 11A to 11B are views showing mask patterns to be used to complement image data in four-pass printing according to the first embodiment. Note that, in this embodiment, the four-pass printing shown in FIG. 12 to be described later is realized by using two types of mask pattern sets (respectively shown in FIGS. 6, 11A and 11B). Two mask patterns in each set have complementary relationship with each other.

One of the mask pattern sets consist of a 50% sampling mask A pattern (FIG. 6A) with a size of 4×4 pixels and a 50% sampling mask B pattern (FIG. 6B) complementary to the mask A. In the 4×4 pixel matrix shown in FIG. 6C, the upper left pixel is defined as the most significant bit (MSB), and the lower right pixel is defined as the least significant bit (LSB). The mask A pattern is expressed by "1100011110010010". The mask B pattern is expressed by "0011100001101101".

The other of the mask pattern sets consist of a 50% sampling mask C pattern (FIG. 11A) with a size of 4×4 pixels (the size is the same as those shown in FIGS. 6A and 6B) and a 50% sampling mask D pattern (FIG. 11B) complementary to the mask C. Just like the 4×4 pixel matrix shown in FIG. 6C, the upper left pixel is defined as the most significant bit (MSB), and the lower right pixel is defined as the least significant bit (LSB). The mask C pattern is expressed by "1010110110010100". The mask D pattern is expressed by "0101001001101011".

These mask patterns A-D are generated in the host apparatus by using a random number sequence or a random function or stored in the host apparatus in advance.

Figure 24:
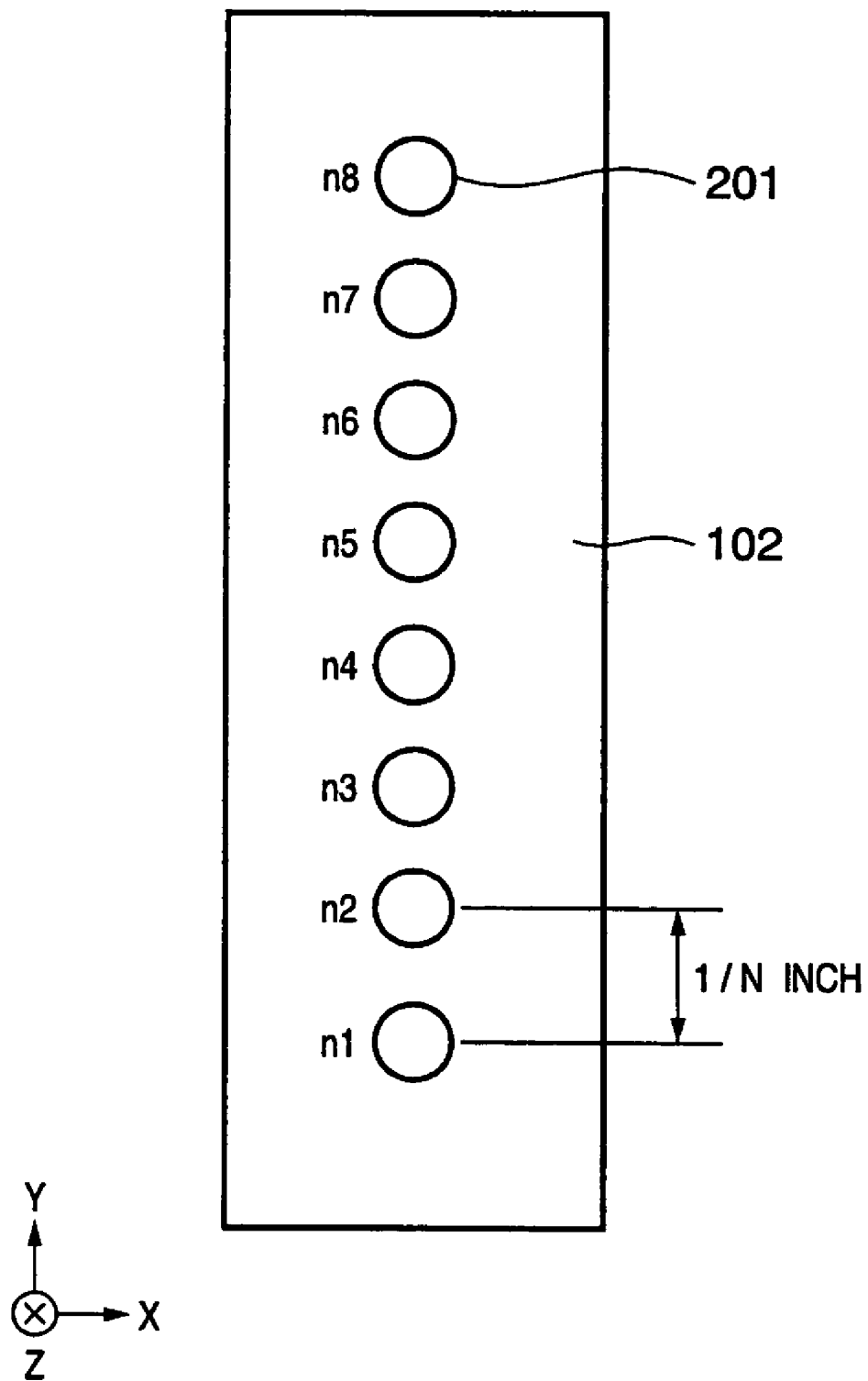
FIG. 24 is a view schematically showing the nozzle array of an inkjet printhead.
Figure 25:
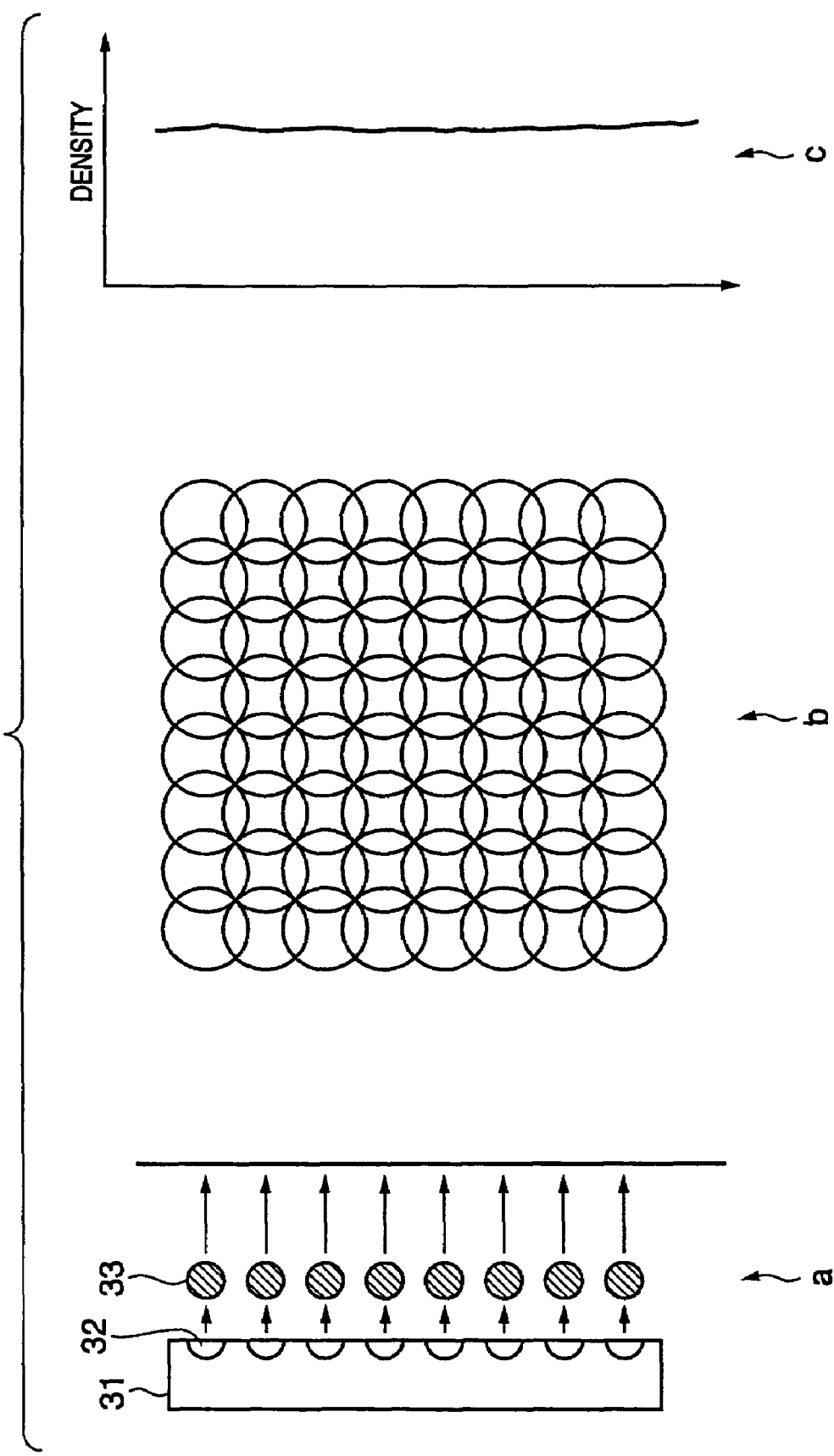
FIG. 25 is a view for explaining an ideal printing state by the inkjet printhead.
Figure 28A:
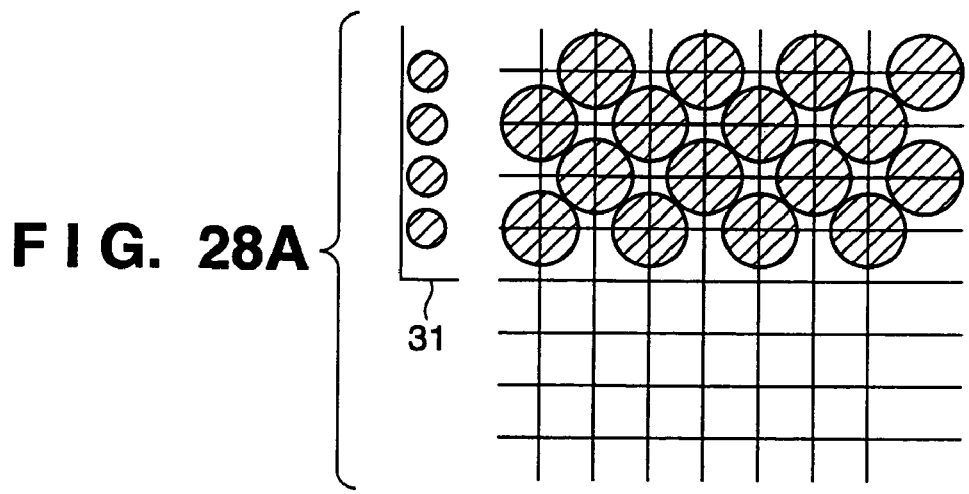
FIGS. 28A, 28B, and 28C are views for explaining another example of density unevenness suppression by the multi-pass printing method.
Figure 28B:
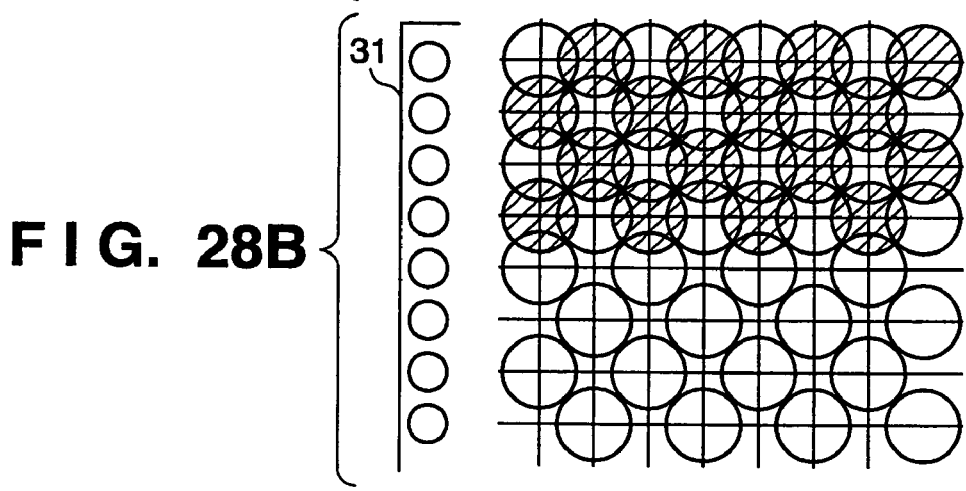
Figure 28C:
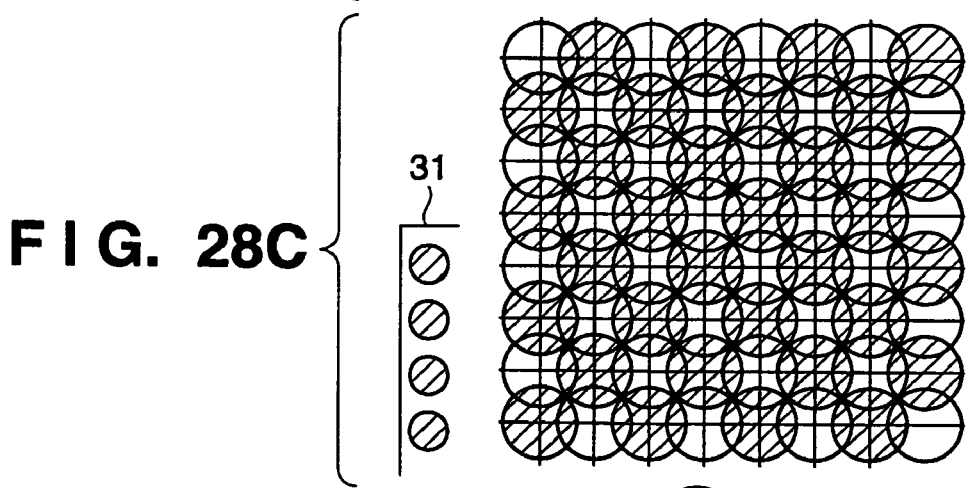

In this embodiment, a printhead having eight orifices (n1 to n8) at a density of N=600 per inch, as shown in FIG. 24, is used. Ink of about 5 pl is discharged from one orifice.

Figure 6A:
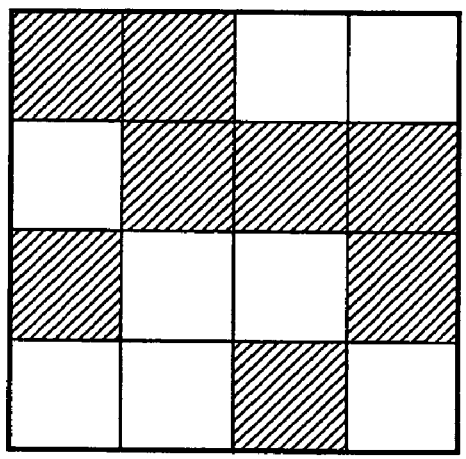
FIGS. 6A, 6B, and 6C are views showing sampling mask patterns according to the first embodiment of the present invention.
Figure 6B:
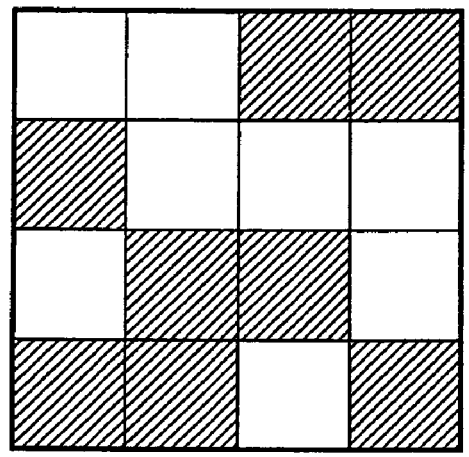
Figure 6C:
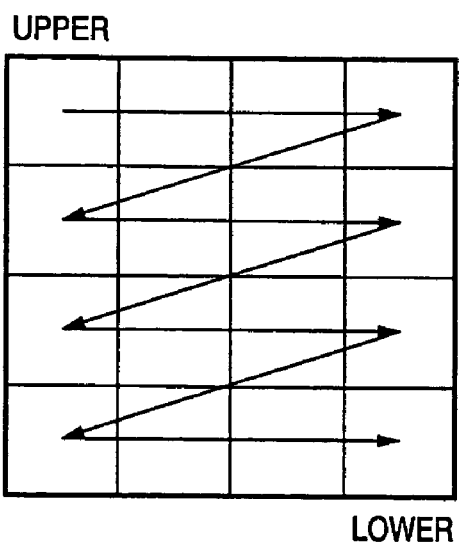
Figure 7A:
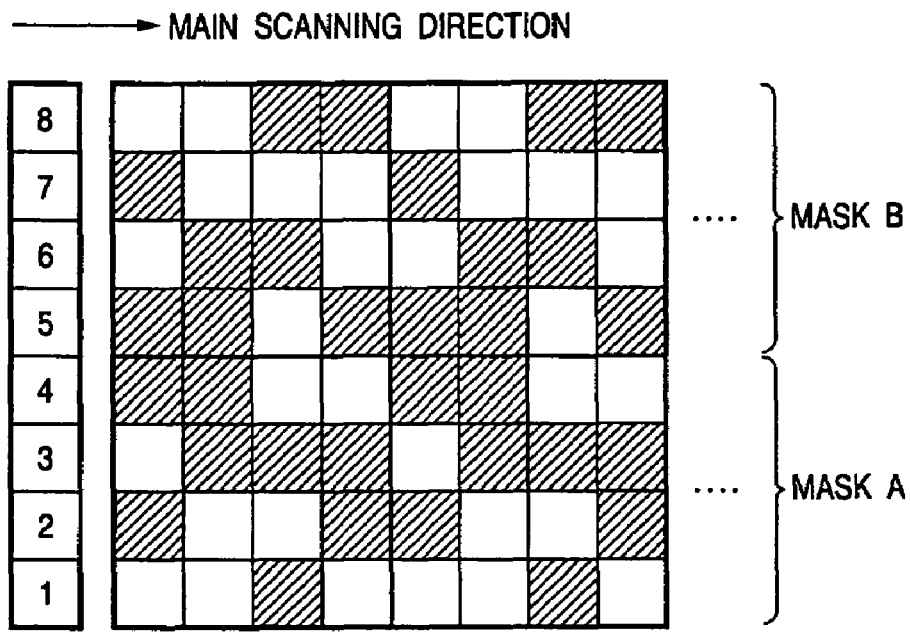
FIGS. 7A and 7B are views for explaining the relationship between the sampling mask patterns and orifice positions on a printhead according to the first embodiment of the present invention.
Figure 7B:
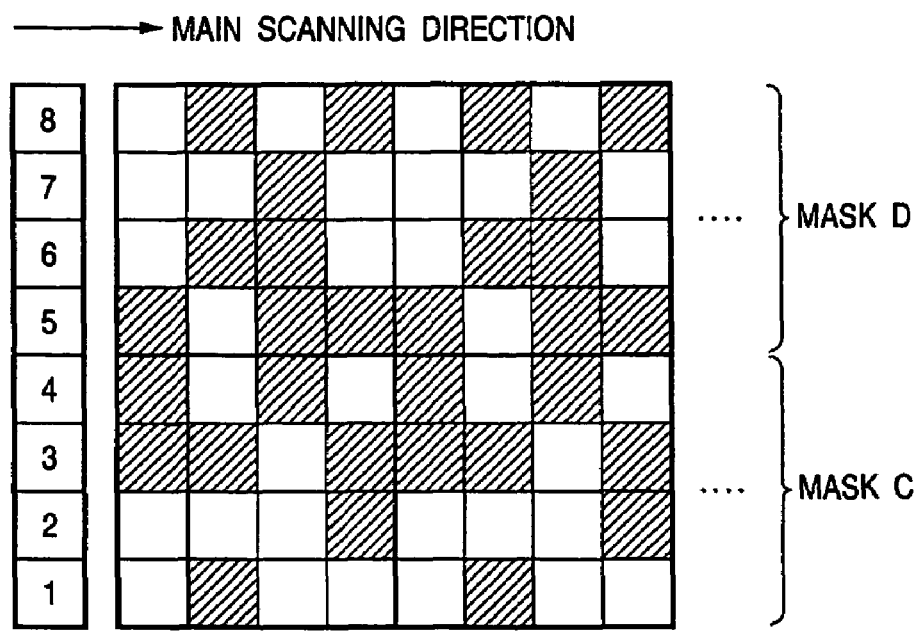

FIG. 7A is a view showing the relationship between the mask patterns shown in FIGS. 6A and 6B and the orifice of the printhead shown in FIG. 24. FIG. 7B is a view showing the relationship between the mask patterns shown in FIGS. 11A and 11B and the orifice of the printhead shown in FIG. 24.

Numbers on the left side of FIG. 7A indicate the orifice positions on the printhead shown in FIG. 24. The orifices n1 to n4 corresponds to the mask A pattern shown in FIG. 6A, and this pattern is repeatedly used in the main scanning direction. On the other hand, the orifices n5 to n8 correspond to the mask B pattern shown in FIG. 6B, and this pattern is repeatedly used in the main scanning direction.

Likewise, numbers on the left side of FIG. 7A indicate the orifice positions on the printhead shown in FIG. 24. The orifices n1 to n4 corresponds to the mask C pattern shown in FIG. 11A, and this pattern is repeatedly used in the main scanning direction. On the other hand, the orifices n5 to n8 correspond to the mask D pattern shown in FIG. 11B, and this pattern is repeatedly used in the main scanning direction.

Figure 12:
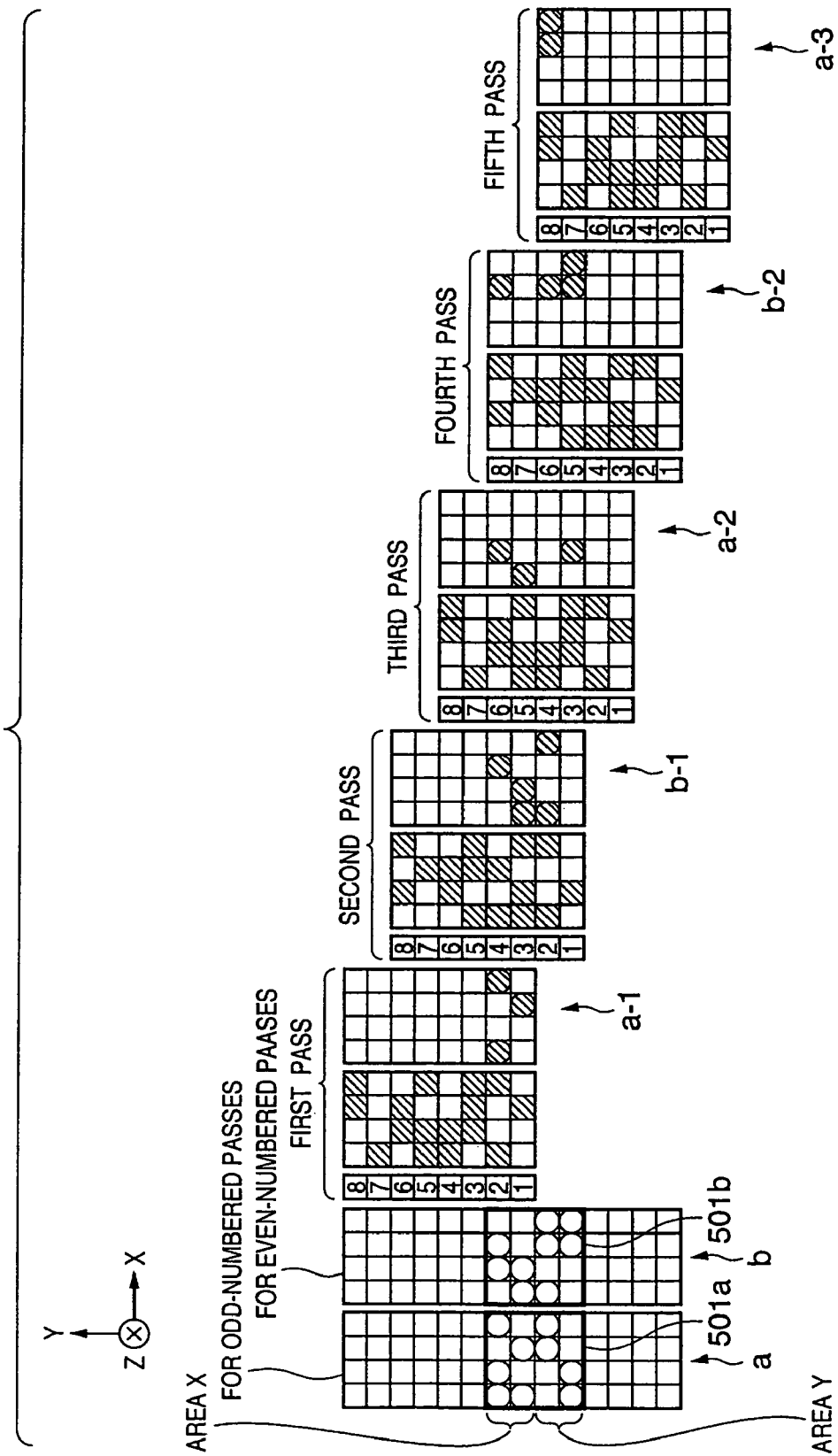
FIG. 12 is a view for explaining image data to be used for scan printing according to the second embodiment of the present invention.

FIG. 12 is a view showing image data to be used for scanning which are obtained by sampling, by using the mask pattern shown in FIG. 7A. The image data is used for odd-numbered pass printing shown in FIG. 5A and is used for even-numbered pass printing shown in FIG. 5B. More specifically, the mask patterns A and B shown in FIG. 7A are used for odd-numbered ($1^{st}$, $3^{rd}$, ..., Nth) pass printing, while the mask patterns C and D shown in FIG. 7B are used for even-numbered ($2^{nd}$, $4^{th}$, (N+1)th) pass printing.

Referring to FIG. 12, matrices 501a and 501b indicated by bold lines in image data a and b represent the image data shown in FIGS. 5A and 5B, respectively. An area comprised of two upper rasters of matrices 501a and 501b respectively encircled by bold lines on a printing medium is defined as X. An area comprised of two lower rasters of matrices 501a and 501b respectively encircled by bold lines on a printing medium is defined as Y. The area X is printed by four passes comprised of $1^{st}$ to $4^{th}$ printing passes, while the area Y is printed by four passes comprised of $2^{nd}$ to $5^{th}$ printing passes. Areas other than the areas X and Y are printed by four passes in the same manner, although the starting pass number is different.

In the first pass printing, for the image data a to be used for odd-numbered pass printing, a printing medium is moved up to the positions of the top orifices n1 and n2 of the eight orifices n1 to n8. The mask A pattern shown in FIG. 6A is applied to the positions of the orifices n1 to n4. Simultaneously, the mask B pattern shown in FIG. 6B is applied to the positions of the orifices n5 to n8. Image data is extracted at a position where the image data is ON (a position where a print dot exists) and the applied mask pattern is ON (black pixel), as indicated by a-1. The extracted image data is used for printing by orifices n1 and n2 on the area X.

Figure 11A:
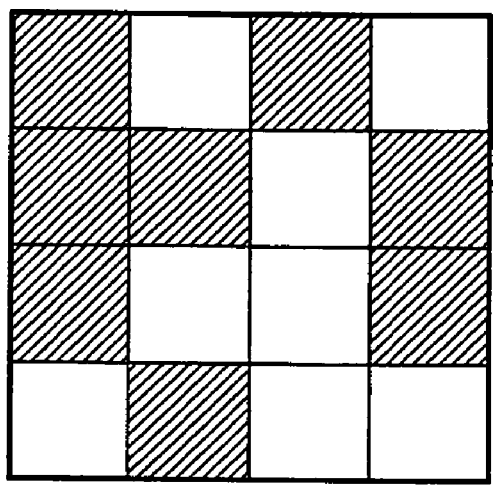
FIGS. 11A and 11B are views showing sampling mask patterns according to the second embodiment of the present invention.
Figure 11B:
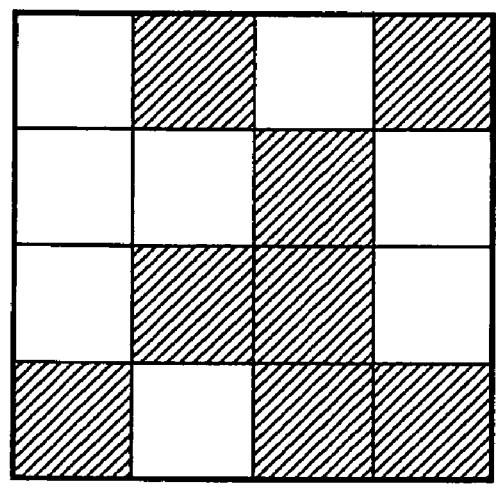

In the second pass printing, for the image data b to be used for even-numbered pass printing, the printing medium is moved up to the positions of the orifices n1 to n4 of the eight orifices n1 to n8. The mask C pattern shown in FIG. 11A is applied to the positions of the orifices n1 to n4. Simultaneously, the mask D pattern shown in FIG. 11B is applied to the positions of the orifices n5 to n8. Image data is extracted at a position where the image data is ON (a position where a print dot exists) and the applied mask pattern is ON (black pixel), as indicated by b-1. The extracted image data is used for printing by orifices n3 and n4 on the area X and by orifices n1 and n2 on the area Y.

In the third pass printing, for the image data a to be used for odd-numbered pass printing, the printing medium is moved up to the positions of the orifices n3 to n6 of the eight orifices n1 to n8. The mask A pattern shown in FIG. 6A is applied to the positions of the orifices n1 to n4. Simultaneously, the mask B pattern shown in FIG. 6B is applied to the positions of the orifices n5 to n8. Image data is extracted at a position where the image data is ON (a position where a print dot exists) and the applied mask pattern is ON (black pixel), as indicated by a-2. The extracted image data is used for printing by orifices n5 and n6 on the area X and by orifices n3 and n4 on the area Y.

In the fourth pass printing, for the image data b to be used for even-numbered pass printing, the printing medium is moved up to the positions of the orifices n5 to n8 of the eight orifices n1 to n8. The mask C pattern shown in FIG. 11A is applied to the positions of the orifices n1 to n4. Simultaneously, the mask D pattern shown in FIG. 11B is applied to the positions of the orifices n5 to n8. Image data is extracted at a position where the image data is ON (a position where a print dot exists) and the applied mask pattern is ON (black pixel), as indicated by b-2. The extracted image data is used for printing by orifices n7 and n8 on the area X and by orifices n5 and n6 on the area Y.

In the fifth pass printing, for the image data a to be used for odd-numbered pass printing, the printing medium is moved up to the positions of the orifices n7 and n8 of the eight orifices n1 to n8. The mask A pattern shown in FIG. 6A is applied to the positions of the orifices n1 to n4. Simultaneously, the mask B pattern shown in FIG. 6B is applied to the positions of the orifices n5 to n8. Image data is extracted at a position where the image data is ON (a position where a print dot exists) and the applied mask pattern is ON (black pixel), as indicated by a-3. The extracted image data is used for printing by orifices n7 and n8 on the area Y.

As described above, the image data corresponding to the area X is used for four-printing in the $1^{st}$ to $4^{th}$ passes, while the image data corresponding to the area Y is used for four-printing in $2^{nd}$ to $5^{th}$ passes.

Furthermore, this embodiment uses two types of mask sets. One of the mask sets is used for complementing image data in only odd-numbered passes and the other of the mask sets is used for complementing image data in only even-numbered passes in 4-pass printing. More specifically, the mask set to be used is switched over in each scan such that the mask set shown in FIG. 7A is used in odd-numbered passes, while the mask set shown in FIG. 7B is used in even-numbered passes.

In this way, printed dots are more randomized in each scan, thus making it possible to greatly reduce density unevenness.

FIGS. 13A and 13B are views showing image data thinned by using the mask patterns to be used for scan printing and data that express only bit positions indicated by the mask patterns where printing is valid.

In FIG. 13A, image data extracted by the processing shown in FIG. 12, which is to be used for scan printing, is made to correspond to the region of each of the mask patterns A, B, C and D and expressed by 16 bits. Each bit sequence is the same as in FIG. 6C.

In FIG. 13B, each image data expressed by 16 bits for each scanning shown in FIG. 13A is compressed to a ½ size and expressed as 8-bit image data.

The compression and decompression of the compressed image data are done by the following processing.

Figure 29A:
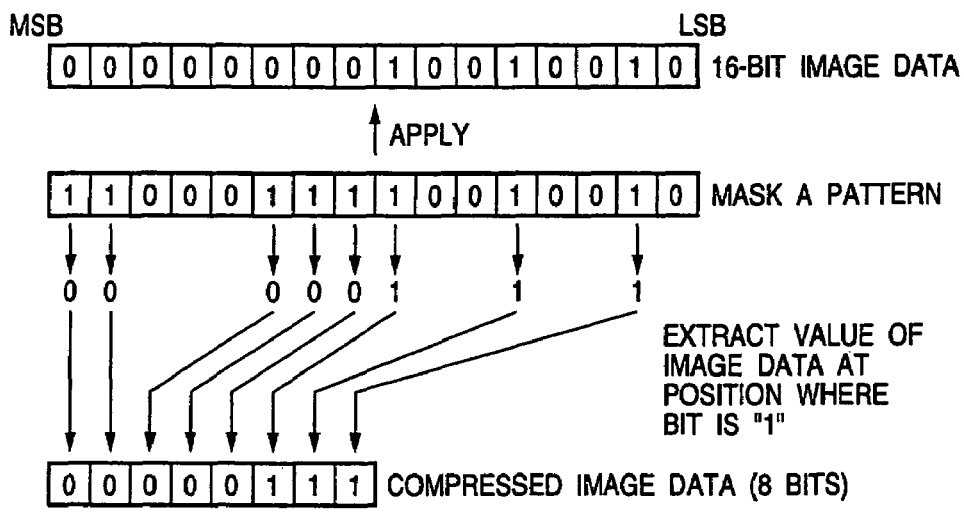
FIGS. 29A and 29B are views for explaining image data compression and decompression methods.
Figure 29B:
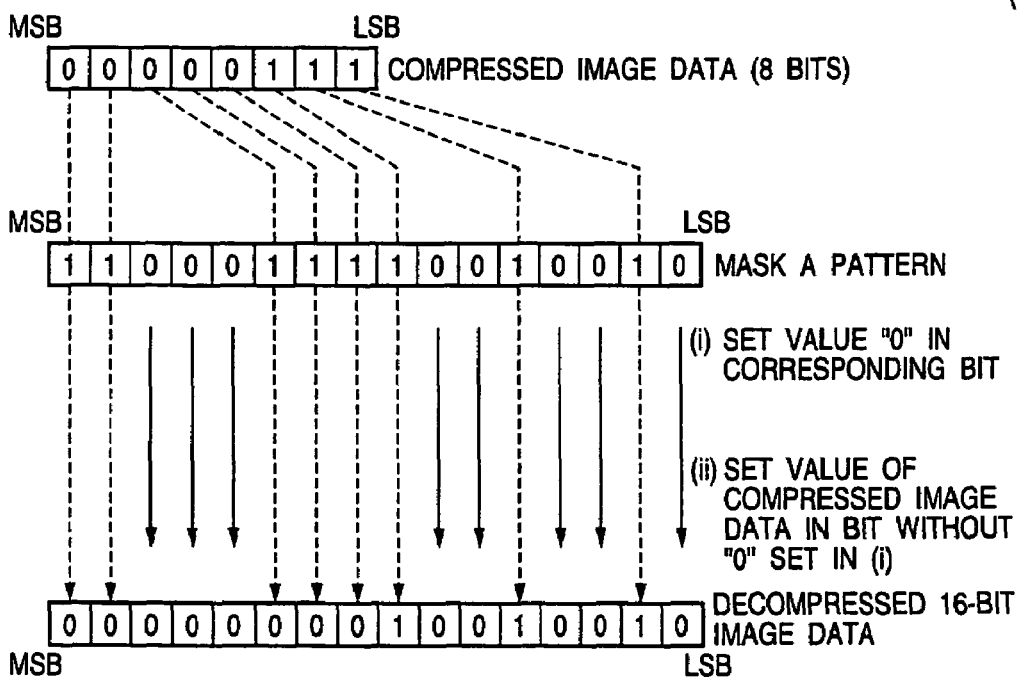

FIGS. 29A and 29B are views for explaining processing of generating compressed image data and decompressing the compressed image data to the original image data. Referring to FIGS. 29A and 29B, for example, 16-bit image data shown in FIG. 13A, which is used for the first pass printing to which the mask A pattern is applied, and the mask A pattern shown in FIG. 6A are used.

The compression processing will be described first.

As shown in FIG. 29A, the 16-bit mask A pattern is applied to the 16-bit image data. The value of image data at each bit position where the value is "1 (ON)" in the mask A pattern is extracted. With this processing, the 16-bit image data is compressed to 8-bit data. The same processing is executed for the 16-bit image data used for the first pass printing to which the mask B pattern is applied. Further, the same processing is executed for the 16-bit image data used for odd-numbered passes of the third and subsequent passes. Meanwhile, the compression processing using the mask C pattern and mask D pattern is executed for even-numbered passes such as the second and fourth passes. Note that the compression scheme is the same as that for odd-numbered passes.

With this processing, the compressed image data shown in FIG. 13B is obtained. With this processing, the image data amount decreases to ½. When this processing is executed by the host apparatus, and obtained compressed image data is transferred to the printing apparatus, the transfer image data amount decreases to ½. In addition to the compressed image data, the mask pattern which has been used for the compression is also transferred to the printing apparatus from the host apparatus. More specifically, information on the mask patterns A and B is transferred for printing in odd-numbered passes, while information on the mask patterns C and D is transferred for printing in even-numbered passes. The printing apparatus performs decompression processing, based on the transferred mask patterns and transferred compressed image data.

The compressed image data decompression processing will be described next.

As shown in FIG. 29B, in the 16-bit image data to be decompressed, "0" is set at each position corresponding to a bit position with a value "0 (OFF)" in the 16-bit mask A pattern. The value of compressed image data is sequentially set from the MSB side for the remaining bits in which the value "0" is not set. The same processing is executed for 8-bit compressed image data used for the first pass printing to which the mask B pattern is applied. Further, the same processing is executed for 8-bit compressed image data used for odd-numbered passes of the third and subsequent passes. Meanwhile, the decompression processing using the mask C pattern and mask D pattern is executed for even-numbered passes such as the second and fourth passes. Note that the decompression scheme is the same as that for odd-numbered passes.

With this processing, the compressed image data shown in FIG. 13B is decompressed into the 16-bit original image data shown in FIG. 13A. When this processing is executed by the printing apparatus, image data can be decompressed by using the mask patterns and compressed image data transferred from the host apparatus, and a print operation can be executed on the basis of the decompressed image data.

Figure 10:
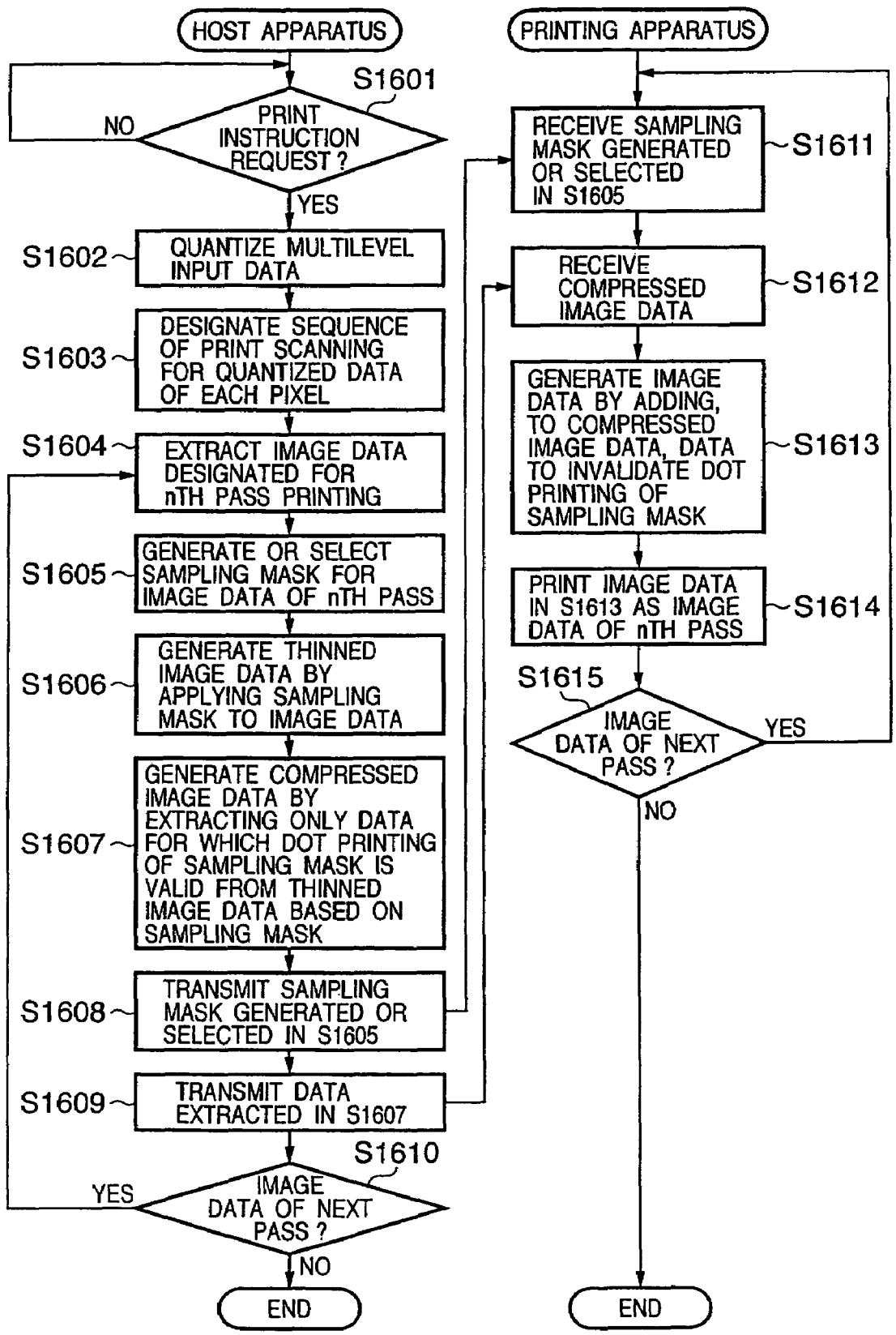
FIG. 10 is a flowchart showing the print operation of a printing system according to the first embodiment of the present invention.

FIG. 10 is a flowchart showing data processing executed by a printing system according to this embodiment.

Processing on the host apparatus side will be described first.

First, when an application requests a print instruction in the host apparatus 700 in step S1601, quantization processing of converting input multilevel image data into a dot image is executed in step S1602. In step S1603, the sequence of print scanning is designated for the data of each quantized pixel, as described in FIGS. 2 and 3.

In step S1604, image data designated for the nth pass printing is extracted, as described in FIGS. 4, 5A, and 5B. More specifically, the sub-pixel a shown in FIG. 4, i.e., the image data shown in FIG. 5A is extracted for the odd-numbered passes, i.e., the first, third, and fifth passes. The sub-pixel b shown in FIG. 4, i.e., the image data shown in FIG. 5B is extracted for the even-numbered passes, i.e., the second and fourth passes.

In step S1605, the sampling mask patterns for the image data, which are described in FIGS. 6A to 6C, 7A to 7B, 11A, 11B, 12, 13A, and 13B are generated or selected from a location where the mask patterns are stored in advance. More specifically, the mask patterns A and B described in connection with FIGS. 6A and 6B are used for scan-printing in odd-numbered passes, while the mask patterns C and D described in connection with FIGS. 11A and 11B are used for scan-printing in even-numbered passes. In step S1606, thinned image data is generated by applying the sampling mask patterns generated or selected in step S1605 to the image data extracted in step S1604. In this case, as described with reference to FIG. 12, the image data a-1 is generated in the first pass, the image data b-1 is generated in the second pass, the image data a-2 is generated in the third pass, the image data b-2 is generated in the fourth pass, and the image data a-3 is generated in the fifth pass.

Next, in step S1607, data only at data positions where dot print of the sampling masks is valid are extracted from the image data thinned by applying the mask patterns in step S1606 so as to generate compressed image data. Note that the compressed image data generation scheme has been already described with reference to FIGS. 13A, 13B, 29A and 29B. The image data thinned by applying the sampling mask patterns in step S1606 is shown in FIG. 13A. Compressed image data obtained by compressing the image data shown in FIG. 13A to ½ is shown in FIG. 13B.

In step S1608, the sampling mask patterns generated or selected from the location where they are stored in advance in step S1605 are transmitted from the host apparatus to the printing apparatus. More specifically, the mask patterns A and B shown in FIGS. 6A and 6B are transferred in odd-numbered passes, while the mask patterns C and D are transferred in even-numbered passes. In this way, according to this embodiment, different mask patterns in each scan are transferred from the host apparatus to the printing apparatus since different mask patterns are used in each scan.

In step S1609, the compressed image data generated in step S1607 is transmitted from the host apparatus to the printing apparatus. In step S1610, it is determined whether image data to be used for printing in the next pass (next scanning) is present.

In this embodiment, when the image data shown in FIG. 4 is to be printed, the printing can be completed in the fifth pass, as shown in FIG. 12. Hence, the processing in steps S1604 to S1609 is repeatedly executed until the fifth pass.

Processing in the printing apparatus 701 will be described next.

In step S1611, the sampling mask patterns generated or selected in step S1605 and transmitted from the host apparatus are received. In step S1612, the compressed image data transmitted from the host apparatus is received.

In step S1613, invalid data is added to each position invalidated by the sampling mask patterns, as described with reference to FIG. 29B, by applying the received sampling mask patterns to the received compressed image data. In this way, the image data is decompressed by applying the sampling mask patterns to the compressed image data generated in step S1606. In this embodiment, the compressed image data of each pass shown in FIG. 13B is decompressed to the original image data shown in FIG. 13A. More specifically, the compressed image data for odd-numbered passes is decompressed by adding a value "0" to each "0"-bit position in the mask A pattern shown in FIG. 6A and the mask B pattern shown in FIG. 6B. On the other hand, the compressed image data for even-numbered passes is decompressed by adding a value "0" to each "0"-bit position in the mask C pattern shown in FIG. 11A and the mask D pattern shown in FIG. 11B.

In step S1614, printing is executed by using the image data decompressed in step S1613. Finally in step S1615, it is determined whether image data to be used for printing in the next pass (next scanning) is present. In this embodiment, when the image data shown in FIG. 4 is to be printed, the printing can be completed in the fifth pass, as shown in FIG. 12. Hence, the processing in steps S1611 to S1614 is repeatedly executed until the fifth pass.

When the above-described control is performed, the amount of image data transferred from the host apparatus to the printing apparatus can be reduced. In addition, a high-quality image can be printed by suppressing density unevenness by multi-pass printing. Especially, it is possible to greatly reduce density unevenness since locations of printed dots in each scan are well-randomized by changing mask patterns to be applied in each scan. The reduction of the image data transfer amount leads to lowering the transfer amount per unit time, i.e., the transfer rate. This makes it possible to use an inexpensive communication interface for low-speed transfer, thus resulting in the cost reduction.

In this embodiment, as shown in FIG. 3, the three quantization levels "0", "1", and "2" are used. However, the present invention is not limited to the three quantization levels. A to C in FIG. 3 may be used by setting two quantization levels "0" and "1". Alternatively, the number of bits of the print scanning designation index shown in FIG. 2 may be increased to three or more by using four or more quantization levels.

Second Embodiment

According to the first embodiment as described above, mask pattern information on all of mask patterns to be used in each scan is transferred from the host apparatus to the printing apparatus. For example, information on the mask pattern A itself and information on the mask pattern B itself are transferred in odd-numbered passes which use the mask patterns A and B. However, in this arrangement, the amount of mask pattern data to be transferred is large.

In this embodiment, in order to reduce the amount of mask pattern data to be transferred, not information on a mask pattern itself but a signal indicating the mask pattern is transferred for part of mask patterns to be used in each scan. In other words, a characteristic feature according to this embodiment is to transfer a signal indicating a particular mask pattern. Note that, since arrangements other than this feature are the same as those in the first embodiment, those arrangements will no longer described.

Figure 14:
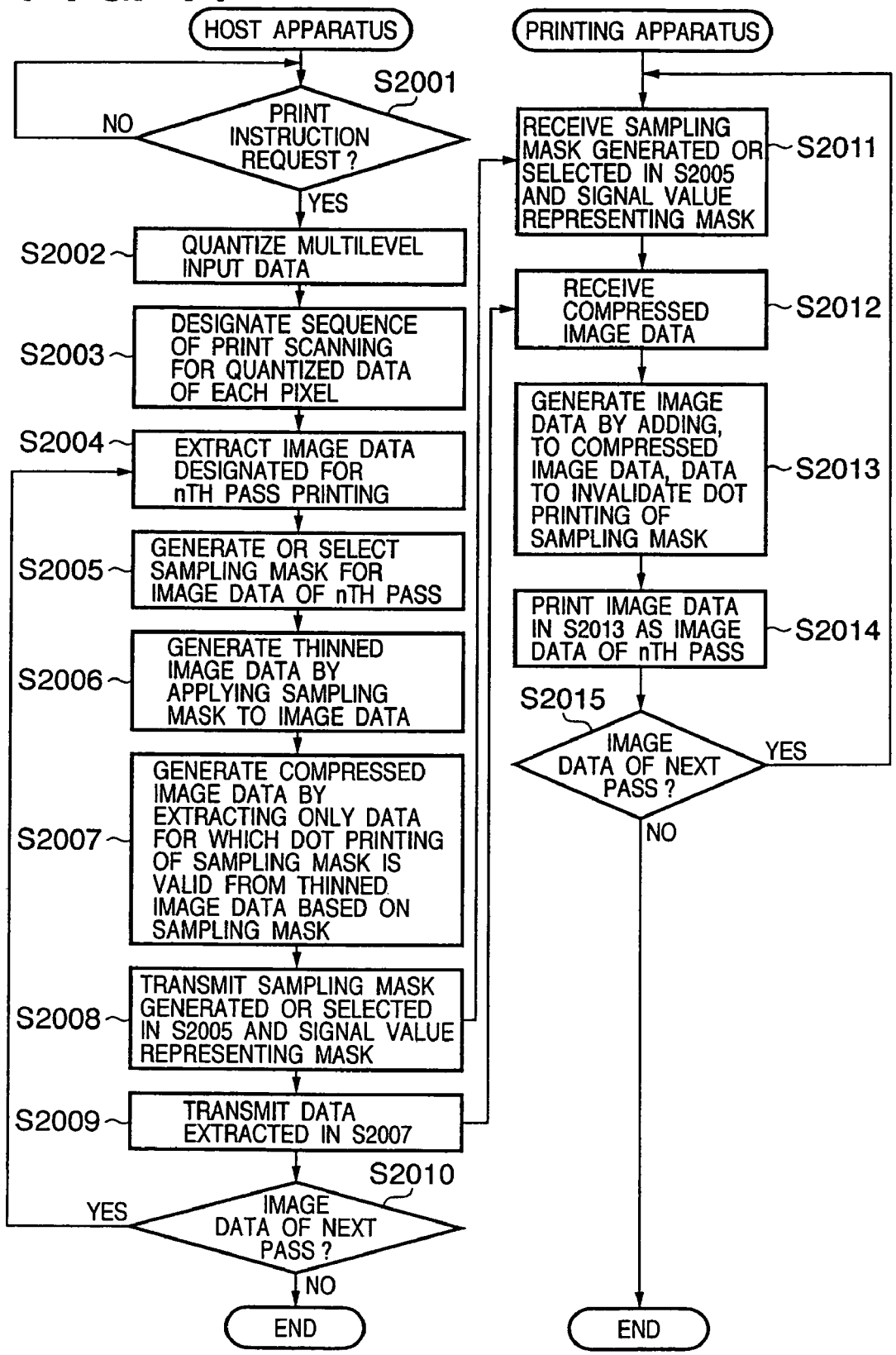
FIG. 14 is a flowchart showing the print operation of a printing system according to the second embodiment of the present invention.

FIG. 14 is a flowchart showing a data processing executed in a printing system according to this embodiment. The characteristic steps in this flowchart are steps S2008, S2011, and S2013. Therefore, these steps are described below in detail, and descriptions on other steps are omitted. Steps S2001 to S2007, S2009 to S2010, S2012, and S2014 to S2015 in FIG. 14 are the same as steps S1601 to S1607, S1609 to S1610, S1612, and S1614 to S1615 in FIG. 10, respectively.

In step S2008, the sampling mask patterns generated or selected from the location where they are stored in advance in step S2005 and signal values corresponding to the mask patterns to be transmitted are transmitted from the host apparatus to the printing apparatus.

FIG. 15 is a view showing the relationship between the sampling mask patterns and signal values.

As described above, the mask A pattern and mask B pattern have a complementary relationship. Hence, when the mask A pattern is transmitted, and then, an instruction to invert the bits of the mask A pattern is transmitted, the mask B pattern can be generated. Similarly, since the mask C pattern mask D pattern have a complementary relation, when the mask C pattern is transmitted, and then, an instruction to invert the bits of the mask C pattern is transmitted, the mask D pattern can be generated.

In this embodiment, therefore, after the mask A pattern is transmitted, a 1-bit signal having a value "0" is transmitted, as shown in FIG. 15, instead of the mask B pattern. Similarly, after the mask C pattern is transmitted, a 1-bit signal having a value "1" is transmitted, as shown in FIG. 15, instead of the mask D pattern. With this arrangement, even when the number of mask patterns to be used increases, the increase of the data transfer amount from the host apparatus to the printing apparatus can be greatly suppressed.

In step S2011, the signals which are transmitted from the host apparatus are received.

In step S2013, invalid data is added to each position invalidated by the sampling mask patterns, as described with reference to FIG. 29B, by applying the received sampling mask patterns and the values of 1-bit signals representing mask patterns described in FIG. 15 to the received image data. In this way, the image data is decompressed by applying the sampling mask patterns to the compressed image data generated in step S2006.

According to the above-described embodiment, instead of some of sampling mask patterns to be transmitted from the host apparatus to the printing apparatus, 1-bit signal values representing the data are transmitted. Hence, the transmission data amount of mask patterns can greatly be decreased.

Third Embodiment

In the arrangement to be described in this embodiment, when a sampling mask pattern is transmitted from a printing apparatus to a host apparatus, a printing apparatus holds a sampling mask pattern.

Image data used in this embodiment is the same as that shown in FIGS. 4, 5A, and 5B described in the first embodiment. Sampling mask patterns are the same as those shown in FIGS. 6A and 6B described in the first embodiment and those shown in FIGS. 11A and 11B. Image data and compressed image data used in each scan printing are the same as those shown in FIGS. 12, 13A, and 13B described in the first embodiment.

Figure 16:
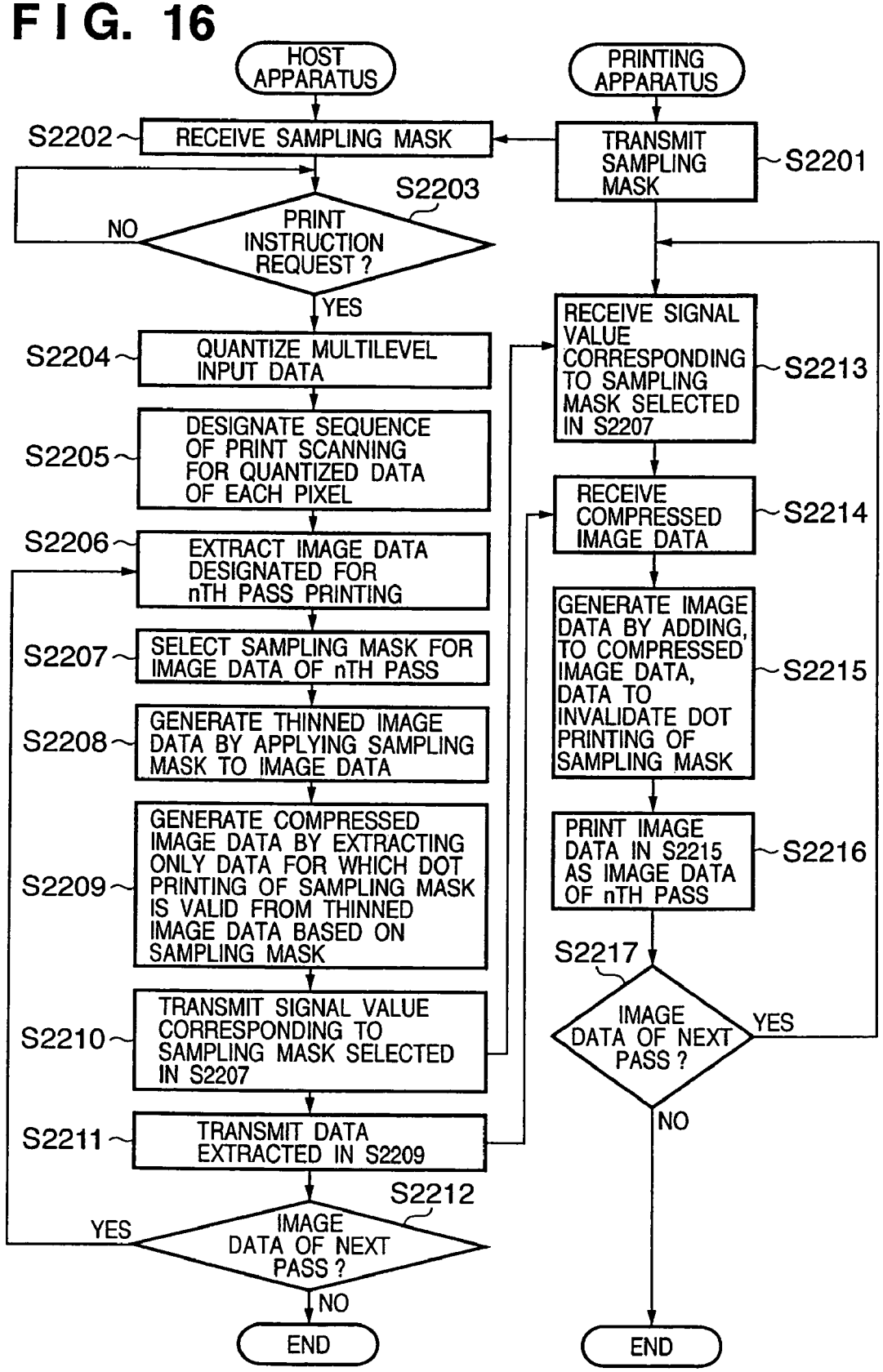
FIG. 16 is a flowchart showing the print operation of a printing system according to the third embodiment of the present invention.

FIG. 16 is a flowchart showing data processing executed by a printing system according to this embodiment.

A setup operation will be described first.

In step S2201, sampling mask patterns to be used for printing are transmitted from a printing apparatus 701 to a host apparatus 700. In step S2202, the host apparatus 700 receives the sampling mask patterns transmitted from the printing apparatus 701.

In this embodiment, the processing in steps S2201 and S2202 is executed at a timing when the driver for the printing apparatus 701 is installed in the host apparatus 700 or when the printing apparatus 701 and host apparatus 700 are set in a communicable state.

Processing on the host apparatus side will be described next.

First, when an application requests a print instruction in the host apparatus 700 in step S2203, quantization processing of converting input multilevel image data into a dot image is executed in step S2204. In step S2205, the sequence of print scanning is designated for the data of each quantized pixel, as described in the first embodiment.

In step S2206, image data designated for the nth pass printing is extracted, as described in the first embodiment. More specifically, a sub-pixel a shown in FIG. 4, i.e., image data shown in FIG. 5A is extracted for the odd-numbered passes, i.e., the first, third, and fifth passes. A sub-pixel b shown in FIG. 4, i.e., image data shown in FIG. 5B is extracted for the even-numbered passes, i.e., the second and fourth passes.

In step S2207, the sampling mask patterns for the image data, which are described in FIGS. 6A, 6B, 11A, and 11B, are generated or selected from a location where the mask patterns are stored in advance. In this embodiment, the mask patterns described in FIGS. 6A and 6B are used in odd-numbered pass print scanning, as described in the first embodiment. On the other hand, the mask patterns described in FIGS. 11A and 11B are used in even-numbered pass print scanning. In step S2208, thinned image data is generated by applying the sampling mask patterns generated or selected in step S2207 to the image data extracted in step S2206. In this embodiment, as described in the first embodiment with reference to FIG. 12, the image data a-1 is generated in the first pass, the image data b-1 is generated in the second pass, the image data a-2 is generated in the third pass, the image data b-2 is generated in the fourth pass, and the image data a-3 is generated in the fifth pass. In step S2209, compressed image data is generated by extracting dots only at data positions where dot print of the sampling masks is valid from the image data thinned by applying the mask patterns in step S2208.

In this embodiment, as described with reference to FIGS. 13A, 13B, 29A, and 29B, the image data thinned by applying the sampling mask patterns in step S2208 is shown in FIG. 13A. Image data obtained by compressing the image data shown in FIG. 13A to ½ is shown in FIG. 13B.

In step S2210, signal values corresponding to the sampling mask patterns generated or selected from the location where they are stored in advance in step S2207 are transmitted from the host apparatus to the printing apparatus.

As described above, the mask A pattern and mask B pattern have a complementary relationship. The mask C pattern and mask D pattern also have a complementary relationship. In this embodiment, the sampling mask patterns are held in the printing apparatus. Hence, only by transmitting signals indicating printing in odd-/even-numbered passes to the printing apparatus, the mask A pattern and mask B pattern, or the mask C pattern and mask D pattern can be read out and used in the printing apparatus.

Even in this embodiment, therefore, in an odd-numbered pass, a 1-bit signal having a value "0" is transmitted, as shown in FIG. 15. Similarly, in an even-numbered pass, a 1-bit signal having a value "1" is transmitted, as shown in FIG. 15. With this arrangement, the data transfer amount from the host apparatus to the printing apparatus can be prevented from increasing.

In step S2211, the compressed image data generated in step S2209 is transmitted from the host apparatus to the printing apparatus. In step S2212, it is determined whether image data to be used for printing in the next pass (next scanning) is present.

In this embodiment, in a case where the image data shown in FIG. 4 is to be printed, the printing can be completed in the fifth pass, as shown in FIG. 12. Hence, the processing in steps S2206 to S2211 is repeatedly executed until the fifth pass.

Processing in the printing apparatus 701 will be described next.

In step S2213, the 1-bit signals which correspond to the sampling mask patterns generated or selected in step S2207 and are transmitted from the host apparatus are received. In step S2214, the compressed image data transmitted from the host apparatus is received.

In step S2215, invalid data is added to each position invalidated by the sampling mask patterns, as described with reference to FIG. 29B, by applying the values of 1-bit signals representing mask patterns described in FIG. 15 and the held mask patterns to the received image data. In this way, the image data is decompressed by applying the sampling mask patterns to the compressed image data generated in step S2208. In this embodiment, the compressed image data of each pass shown in FIG. 13B is decompressed to the image data of each pass shown in FIG. 13A, as in the first embodiment. More specifically, the compressed data of an odd-numbered pass is decompressed by adding a value "0" to each "0"-bit position in the mask A pattern shown in FIG. 6A and the mask B pattern shown in FIG. 6B. The compressed data of an even-numbered pass is decompressed by adding a value "0" to each "0"-bit position in the mask C pattern shown in FIG. 11A and the mask D pattern shown in FIG. 11B.

In step S2216, printing is executed by using the image data decompressed in step S2215. Finally in step S2217, it is determined whether image data to be used for printing in the next pass (next scanning) is present. In this embodiment, in a case where the image data shown in FIG. 4 is to be printed, the printing can be completed in the fifth pass, as shown in FIG. 12, as in the first embodiment. Hence, the processing in steps S2213 to S2216 is repeatedly executed until the fifth pass.

According to the above-described embodiment, since sampling mask patterns generated and held in the printing apparatus are used, sampling mask patterns optimum for each printing apparatus can be used. Hence, density unevenness can be suppressed more effectively.

Additionally, the transmission data amount from the host apparatus to the printing apparatus can greatly be decreased, as in the first and second embodiments.

Fourth Embodiment

In the first to third embodiments, for quantized data obtaining by quantizing input multilevel image data to three values, two independent mask processing operations are executed by using a pair of complementing data in only odd-numbered pass printing and another pair of complementing data in only even-numbered pass printing. In the fourth embodiment, a case where the number of quantization levels is changed and a case where two or more independent mask processing operations are executed will be described.

FIG. 17 is a view showing an index to designate print scanning for quantized data with a resolution of 600×600 dpi, which is obtained by causing a host apparatus to quantize the pixels of multilevel image data to four values.

As shown in FIG. 17, a pixel of the resolution of 600×600 dpi is divided into four parts, each part being expressed by one bit. Using three upper bits corresponding to three parts "a", "b", and "c", the quantized data are allotted and arranged in the sub-pixels "a", "b", and "c". Data arranged in the sub-pixel "a" is printed in the first or fourth pass. Data arranged in the sub-pixel "b" is printed in the second or fifth pass. Data arranged in the sub-pixel "c" is printed in the third or sixth pass. That is, the print scanning designation index is used for 6-pass printing.

FIG. 18 is a view showing how to allot and arrange quantized image data in the print scanning designation index shown in FIG. 17.

As shown in FIG. 18, for image data quantized to four values, i.e., quantization levels 0, 1, 2, and 3, the number of print dots of quantization level 1 is one, the number of print dots of quantization level 2 is two, and the number of print dots of quantization level 3 is three.

The number of print dots of quantization level 0 is zero, as indicated by A in FIG. 18. This can be expressed by four bits as (0000). The number of print dots of quantization level 1 is one, as indicated by B, C, and D in FIG. 18. This can be expressed by four bits as (1000) of B in FIG. 18, (0100) of C in FIG. 18, and (0010) of D in FIG. 18. The number of print dots of quantization level 2 is two, as indicated by E, F, and G in FIG. 18. This can be expressed by four bits as (1100) of E in FIG. 18, (1010) of F in FIG. 18, and (0110) of G in FIG. 18. The number of print dots of quantization level 3 is three, as indicated by H in FIG. 18. This can be expressed by four bits as (1110).

The example shown in FIG. 18 illustrates how to allot and arrange the image data quantized to four values. For image data quantized to three values, A to G in FIG. 18 can be used. For image data quantized to two values, A to D in FIG. 18 can be used.

In dot allotment of the first embodiment, the dot allotted positions of each pixel of the resolution of 600×600 dpi shown in FIG. 4 are two positions designated by the print scanning designation index shown in FIG. 2. In the fourth embodiment, dots are allotted to four positions designated by the print scanning designation index shown in FIG. 17 and, more specifically, to positions allotted on the basis of the quantization levels shown in FIG. 18.

In the first embodiment, as shown in FIGS. 5A and 5B, image data obtained by extracting pixels of the resolution of 600×600 dpi shown in FIG. 4 from the two portions "a" and "b" designated by the print scanning designation index shown in FIG. 2 is used. In the fourth embodiment, image data (not shown) extracted from the three portions "a", "b", and "c" designated by the print scanning designation index shown in FIG. 17 is used.

Figure 19:
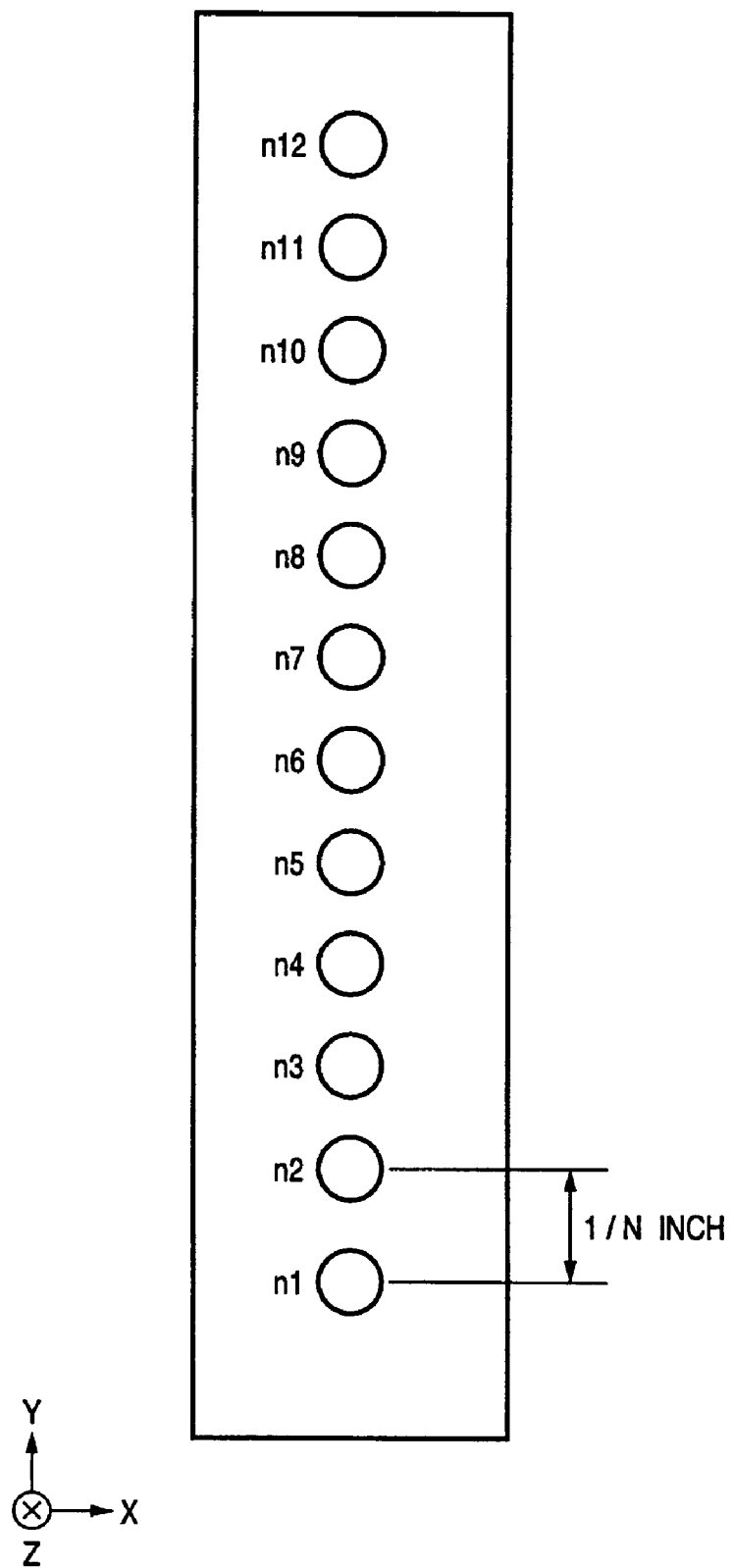
FIG. 19 is a view schematically showing the nozzle array of a printhead according to the fourth embodiment of the present invention.

FIG. 19 is a view showing ink orifices arrayed on a printhead used in this embodiment.

Figure 23:
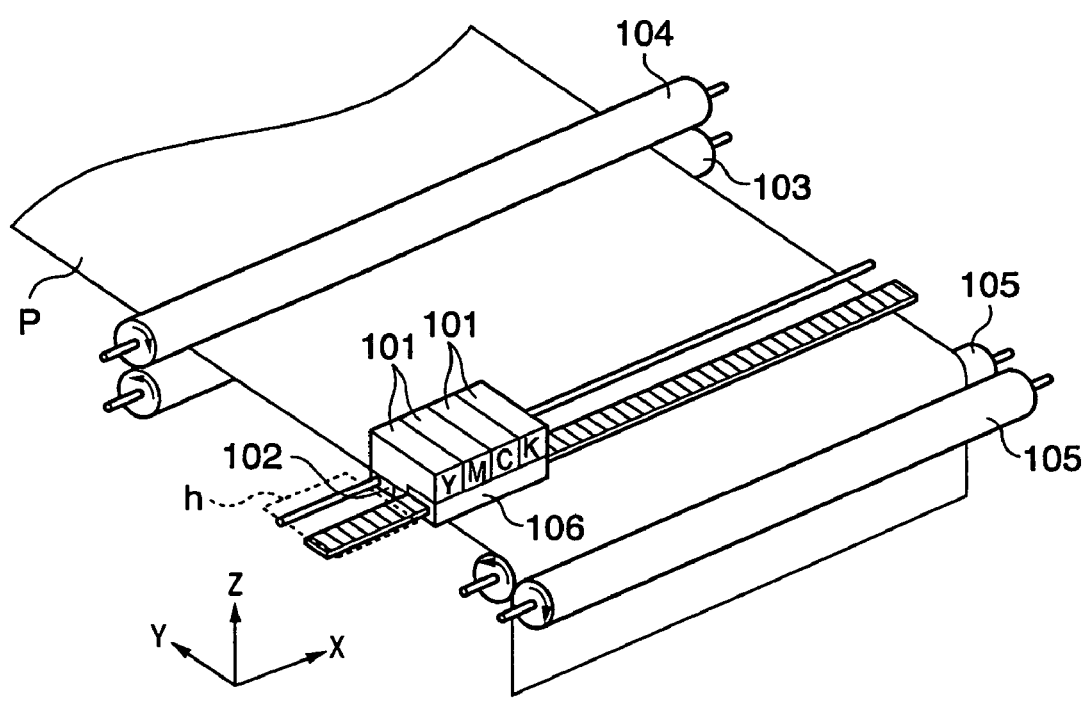
FIG. 23 is a perspective view showing the schematic arrangement of an inkjet printing apparatus.

FIG. 19 shows the ink discharge surface of a printhead 102 in FIG. 23 viewed from the Z direction. Twelve orifices (n1 to n12) are provided at a density of N=600 per inch. Ink of about 4 pl is discharged from one orifice.

FIG. 20 is a view showing mask patterns to be used in 6-pass printing according to this embodiment.

There are three pairs of complementary relationships in the six mask patterns shown in FIG. 20. More specifically, mask patterns E and F have a complementary relation with each other, mask patterns G and H have a complementary relation with each other, and mask patterns I and J have a complementary relation with each other. Each of these mask patterns is a 50% sampling mask pattern with a size of 4 (main scanning direction)×6 (sub-scanning direction: ink orifice array direction) pixels. The mask patterns are generated in the host apparatus by using a random number sequence or a random function or stored in the host apparatus in advance, as in the first and second embodiments.

Figure 21:
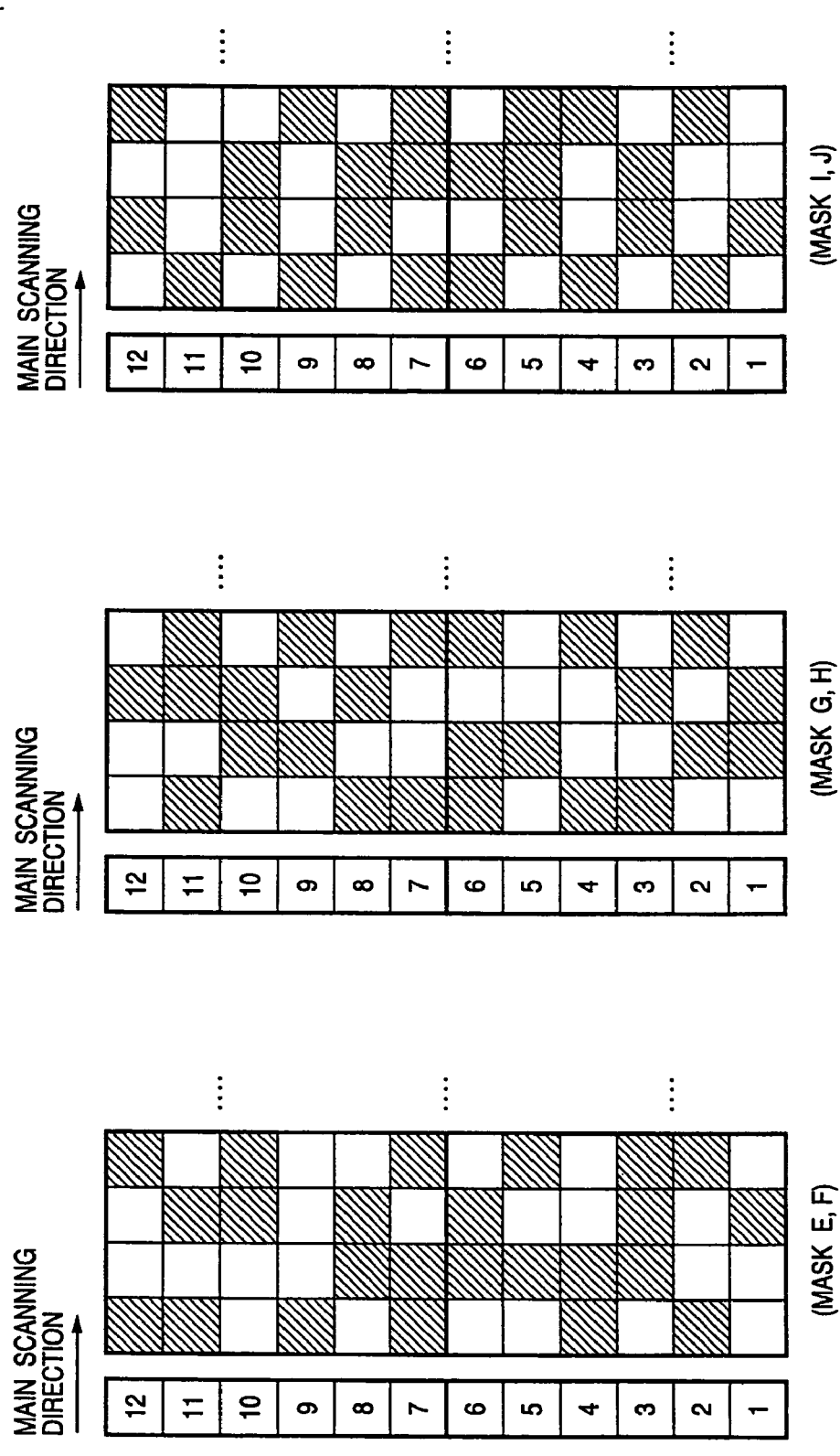
FIG. 21 is a view showing the positional relationship between the sampling mask patterns and the orifices of the printhead according to the fourth embodiment of the present invention.

FIG. 21 is a view showing the correspondence between the orifices of the printhead shown in FIG. 19 and the mask patterns shown in FIG. 20.

FIG. 21 includes three figures, and numbers on the left side of each figure in FIG. 21 indicate the orifice positions on the printhead shown in FIG. 19.

A left figure in FIG. 21 shows a mask pattern used in the $1^{st}$, $4^{th}$ and $7^{th}$ passes. A pair of mask patterns E and F is used in these passes. More specifically, the mask E pattern shown in FIG. 20 is applied to the orifices n1 to n6, and is repeatedly used in the main scanning direction. The mask F pattern shown in FIG. 20 is applied to the orifices n7 to n12, and is repeatedly used in the main scanning direction.

A center figure in FIG. 21 shows a mask pattern used in the $2^{nd}$, $5^{th}$ and $8^{th}$ passes. A pair of mask patterns G and H is used in these passes. More specifically, the mask G pattern shown in FIG. 20 is applied to the orifices n1 to n6, and is repeatedly used in the main scanning direction. The mask H pattern shown in FIG. 20 is applied to the orifices n7 to n12, and is repeatedly used in the main scanning direction.

A right figure in FIG. 21 shows a mask pattern used in the $3^{rd}$, $6^{th}$ and $9^{th}$ passes. A pair of mask patterns I and J is used in these passes. More specifically, the mask I pattern shown in FIG. 20 is applied to the orifices n1 to n6, and is repeatedly used in the main scanning direction. The mask J pattern shown in FIG. 20 is applied to the orifices n7 to n12, and is repeatedly used in the main scanning direction.

The use of these mask patterns and index data for multi-pass printing is the same as that in the first embodiment. Therefore, the description is no longer repeated.

As described above, in this embodiment, a mask pattern set for complementing an image by the first, fourth, seventh, . . . pass printing, a mask pattern set for complementing an image by the second, fifth, eighth, . . . pass printing, and a mask pattern set for complementing an image by the third, sixth, ninth, . . . pass printing are applied. This can be generalized so that an image printed in the nth pass is complemented by an image printed in the (n+3)th pass to complete image printing. In other words, in this embodiment, a mask means is provided which executes three pairs of independent mask processing operations, each pair having a complementary relationship.

As the print operation of a printing system according to this embodiment, the same print operation as already described in the first to third embodiments is executed.

According to the above-described embodiment, even when the quantization levels is changed to two values, three values, or four values, the processing can be simplified by using the same mask patterns. Even when the quantization levels are four values, the amount of image data transferred from the host apparatus to the printing apparatus can be reduced by executing three pairs of independent mask processing operations. In addition, since mask patterns to used are changed in each scan, density unevenness is suppressed so that a high-quality image can be printed.

The decrease of the image data transfer amount leads to lowering the transfer amount per unit time, i.e., the transfer rate. This makes it possible to use an inexpensive communication interface for low-speed transfer, thus resulting in the cost reduction.

Fifth Embodiment

In the first to fourth embodiments, one kind of quantized image data is used. In the fifth embodiment, to implement representation with higher tonality, inks of the same color with different densities are used. In addition, two kinds of quantized image data are used to cope with printing while changing the size of a dot printed by ink.

FIG. 30 is a view showing how to allot and arrange two kinds of image data quantized to five values.

Referring to FIG. 30, two kinds of quantized image data 1 and 2 are made to correspond to each of the five quantization levels 0 to 4. The two kinds of quantized image data are made to correspond to, e.g., two inks of the same color with different densities, i.e., light-color ink (data 1) and dark-color ink (data 2). Alternatively, the two kinds of quantized image data are made to correspond to, e.g., different ink discharge amounts (different dot sizes) of the same color ink, i.e., small dot (data 1) and large dot (data 2). The processing described in the first and second embodiments is executed for each corresponding quantized image data.

Quantization to five values has been described above. However, the present invention is not limited to the five values, and quantization to six or more values may be done. For example, nine quantization levels may the used, and dot allotment may be executed on the basis of the 2×2 print scanning designation index shown in FIG. 17 by using two kinds of quantized image data (e.g., data 1 and data 2 corresponding to two inks of the same color with different densities or data 1 and data 2 corresponding to different ink discharge amounts of the same color ink). The processing described in the fourth embodiment may be executed for each of the two kinds of quantized image data.

In this embodiment, two kinds of quantized image data are used. However, three or more kinds of quantized image data may be used.

[Modification]

In the above-described first to fourth embodiments, in a case where the size of a mask pattern is 16 bits, as shown in FIGS. 6A, 6B, 11A, and 11B, a single mask pattern having a size of 4×4 bits is used in a single print scanning. However, if the number of nozzles of the printhead is, e.g., 128, 128/4=32 kinds of mask patterns may be used in the nozzle array direction. If the mask pattern is to be changed for every 128-pixel data, 32 (=128/4)×32=1024 kinds of different mask patterns may be used. The 16-bit mask pattern has a matrix structure of 4×4 bits. Instead, the aspect ratio of the matrix may be changed to, e.g., 1×16 bits or 2×8 bits.

Sixth Embodiment

In the first to fifth embodiments, the masks used in the same scanning have a complementary relationship. However, the masks used in the same scanning need not always have a complementary relationship, and different masks may be applied to each scanning. That is, even when the masks used in the same scanning have no complementary relationship, multi-pass printing can be implemented if the masks to be used to thin image data corresponding to the same printing region have a complementary relationship. This arrangement will be described in this embodiment.

Note that, in this embodiment, image data compression/decompression processing and data transfer flow are the same as in the first embodiment. More specifically, image data compression/decompression processing using mask patterns is the same as in FIGS. 29A and 29B. The flow of data transfer is the same as in the first embodiment except steps S1603 to S1605 in FIG. 10. That is, in this embodiment, steps S1603 to S1605 are not executed because quantization processing using the print scanning designation index in FIG. 2 is not executed. The data transfer flow according to this embodiment can be obtained by executing steps S1606 to S1615 in FIG. 10 by using the mask patterns of this embodiment. Hence, a description of image data compression/decompression processing and data transfer flow will be omitted below.

Figure 8:
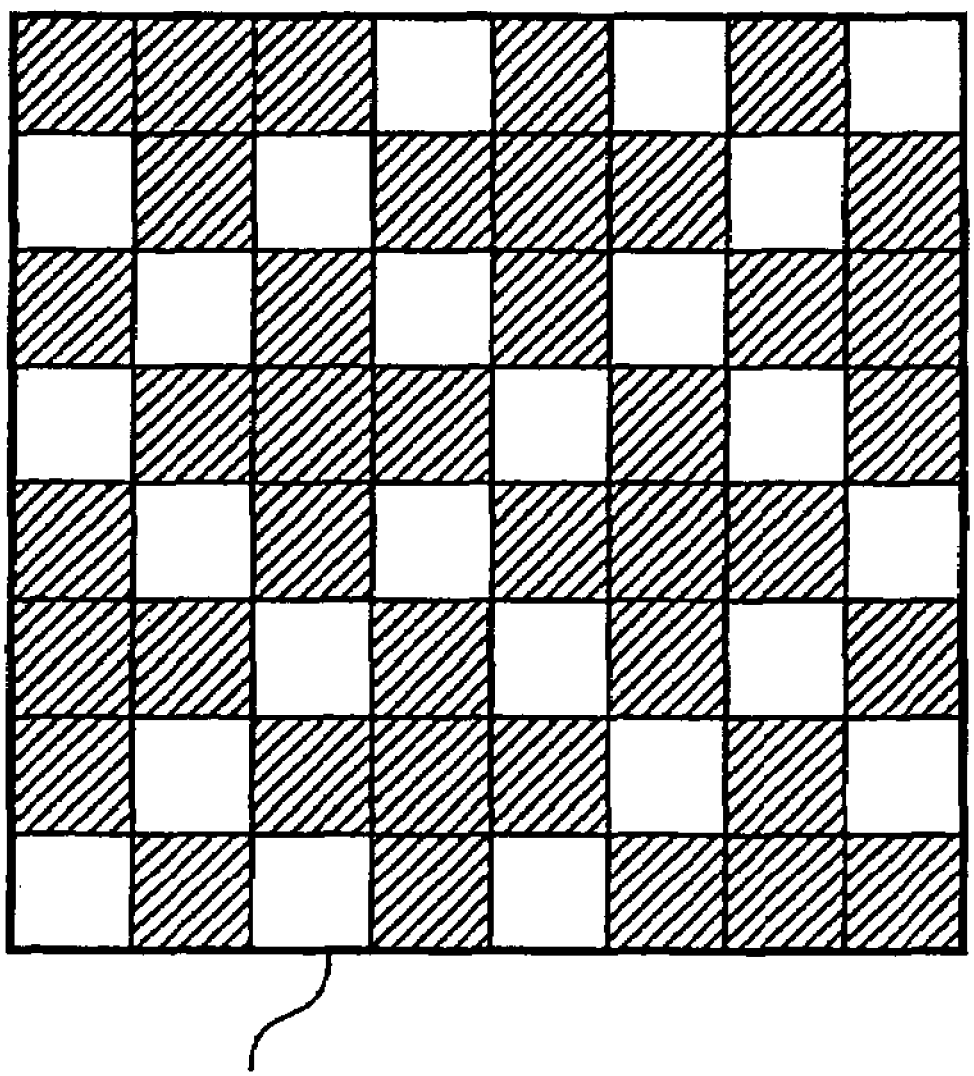
FIG. 8 is a view for explaining image data to be used for scan printing according to the first embodiment of the present invention.

The characteristic feature of this embodiment which is greatly different from the first embodiment is in the methods of mask processing and quantization processing. In the first embodiment, quantization processing using the print scanning designation index shown in FIG. 2 is executed. On the other hand, in this embodiment, no print scanning designation index is used. More specifically, in the sixth embodiment, multilevel image data of each pixel is binarized by error diffusion processing or dither processing in a host apparatus, thereby generating binary image data as shown in FIG. 8. Mask patterns to be described later are applied to the generated binary image data. In the state shown in FIG. 8, which pixel should be printed in which pass is not decided. Such a decision is made by the mask patterns.

Figure 9:
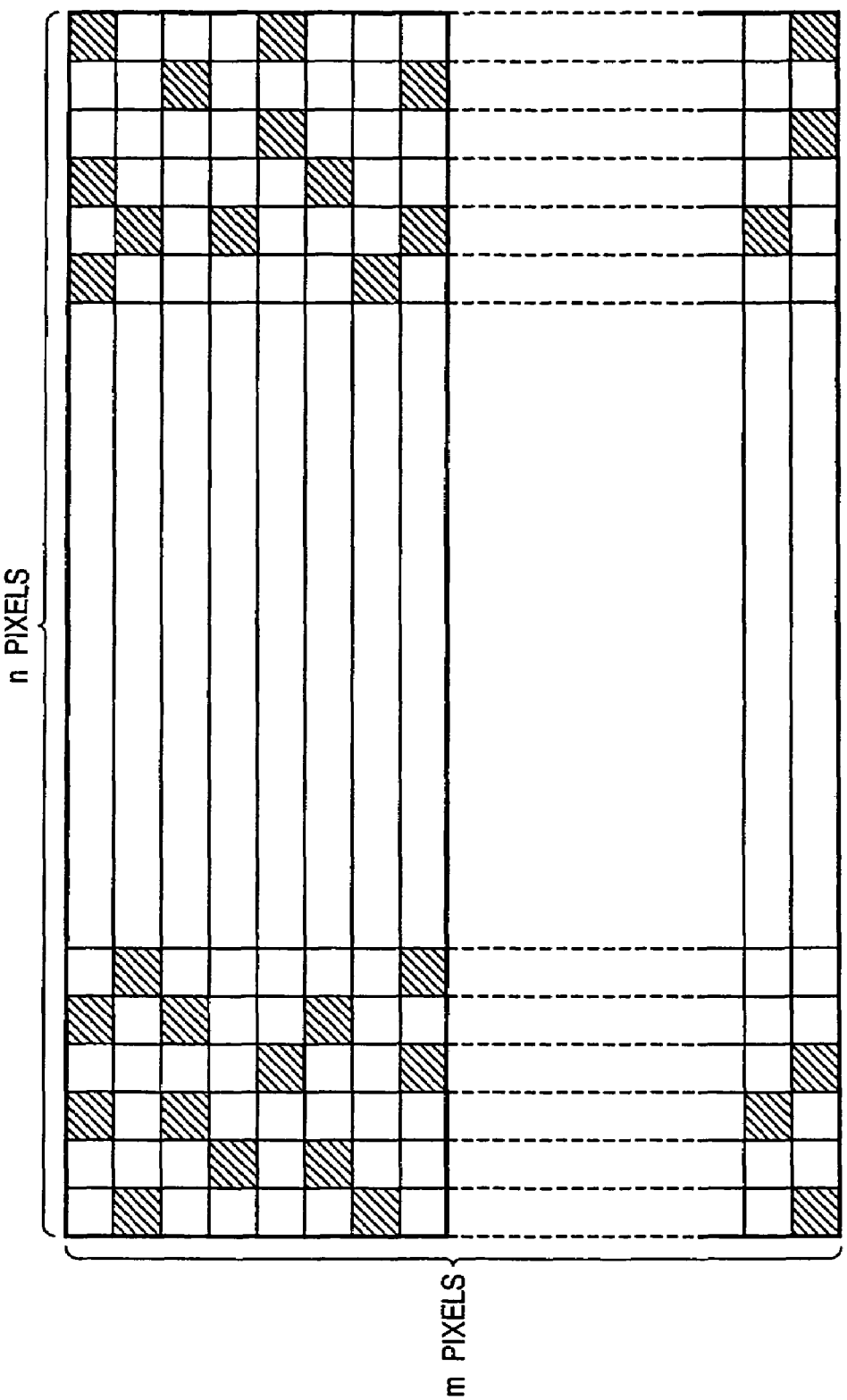
FIG. 9 is an example of a mask pattern use for a four-pass printing.
Figure 22:
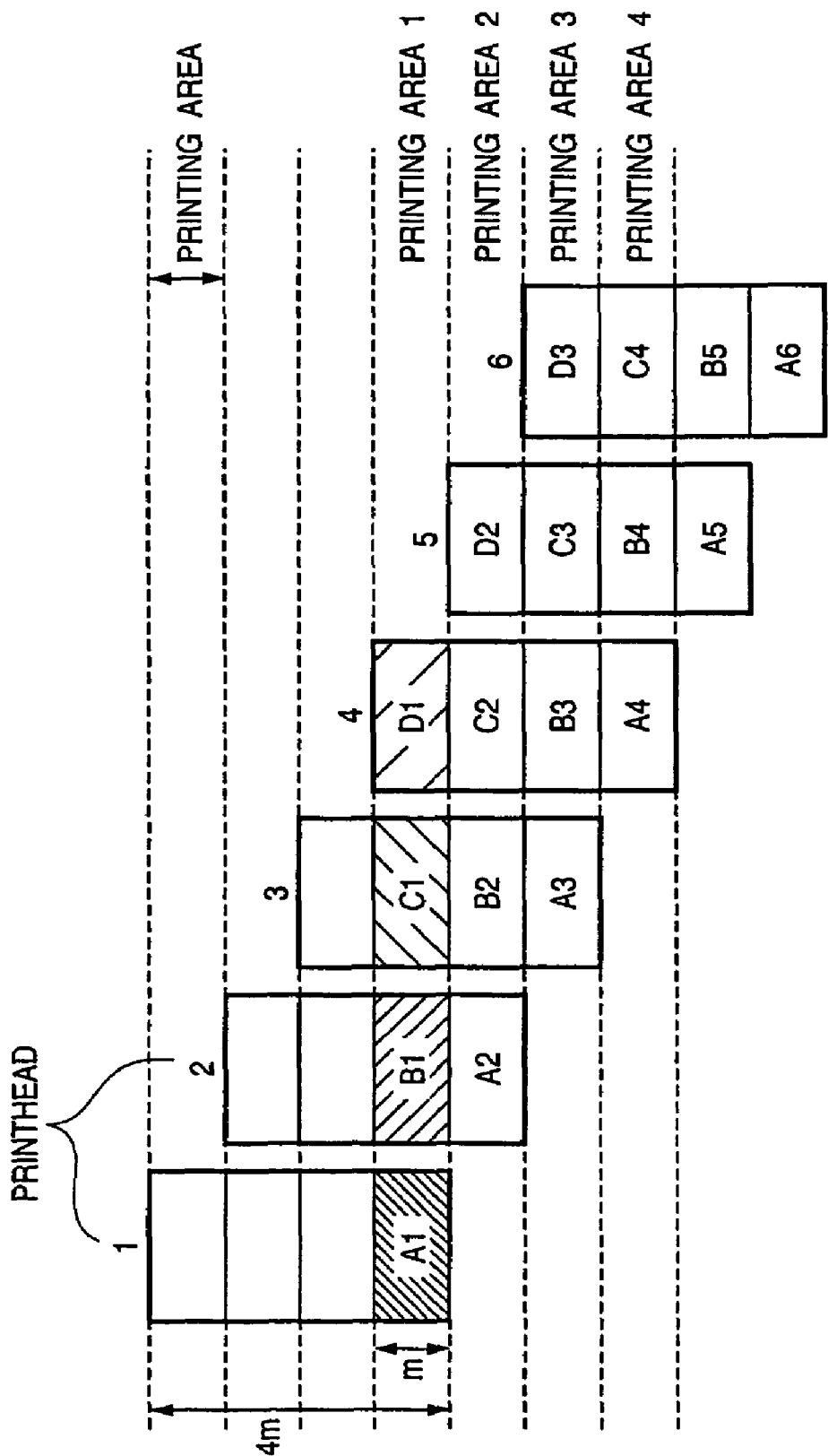
FIG. 22 is a view showing 4-pass printing to be executed in this embodiment in association with a printhead and mask patterns to be used according to the sixth embodiment of the present invention.
Figure 31:
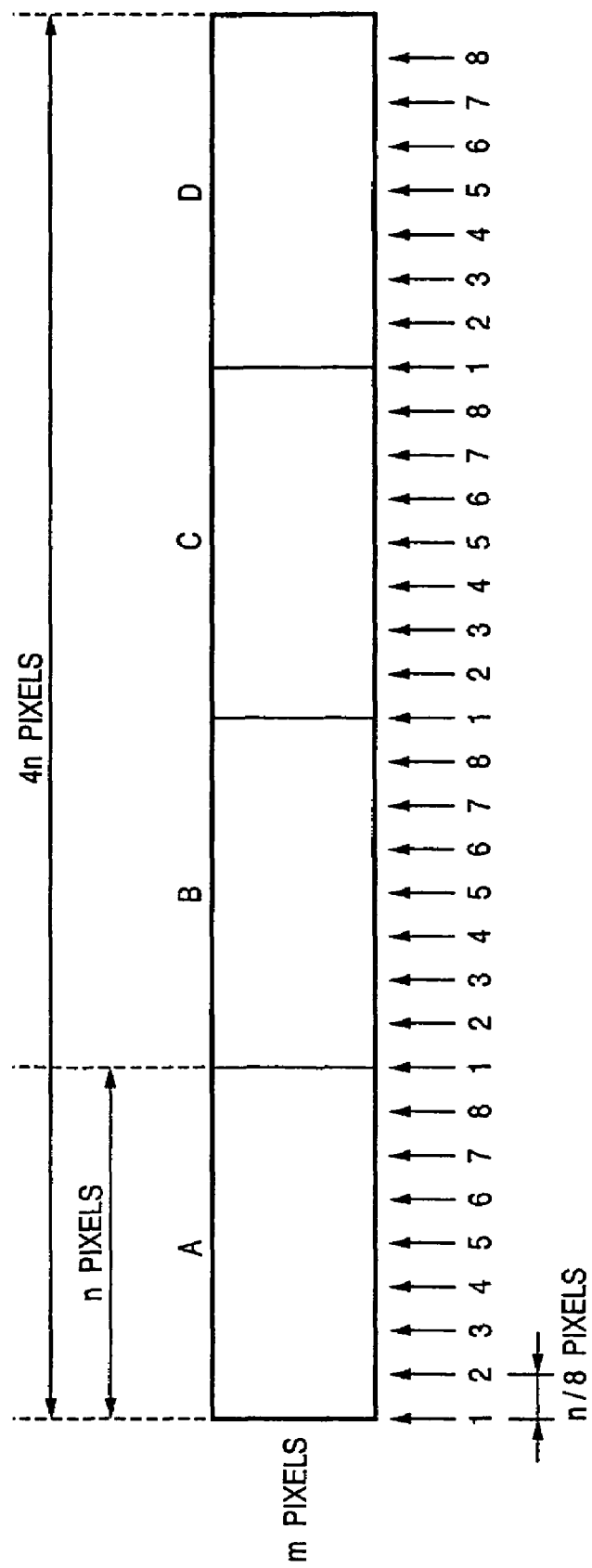
FIG. 31 is a view showing four masks AN, BN, CN, and DN (N=1, 8) having a complementary relationship according to the sixth embodiment.

FIG. 22 shows 4-pass printing to be executed in this embodiment in association with a printhead and mask patterns to be used. The width of a single printing region in the orifice array direction is "m", and the width of the printhead in the orifice array direction is "4×m". For each unit printing region X (X=1, 8), four masks AN, BN, CN, and DN (N=1, 8) having a complementary relationship as shown in FIGS. 9 and 31 (to be described later) are used.

For example, for the printing region 1, four masks A1, B1, C1, and D1 having a complementary relationship are used. For the printing region 2, four masks A2, B2, C2, and D2 having a complementary relationship are used. More specifically, in the printing region 1, the mask A1 is used in the first pass, and the masks B1, C1, and D1 are used in the second, third, and fourth passes, respectively. Printing is completed by a total of four passes. In the printing region 2, the mask A2 is used in the second pass, and the masks B2, C2, and D2 are used in the third, fourth, and fifth passes, respectively. Printing is completed by a total of four passes. This is also applied to the remaining printing regions 3 to 8, and masks corresponding to the number of the printing region are used. The printing regions 1 to 8 are arrayed in this order in the sub-scanning direction. The printing region 1 is arrayed again next to the printing region 8. Hence, a unit of the printing regions 1 to 8 is repeated in the sub-scanning direction.

As described above, in this embodiment, the type of mask pattern to be used is changed for each printing region. The mask pattern used in each scanning also changes naturally.

The masks AN, BN, CN, and DN (N=1, 8) will be described with reference to FIG. 31.

FIG. 31 shows the four masks A, B, C, and D stored in the memory of the host apparatus. Numbers (N: N=1, 8) under arrows indicate mask read positions. The mask N is generated by reading out mask data from a position corresponding to the number. For example, when reading is started from number 1 for the mask A, the mask A1 is generated. More specifically, when n pixels are read out in the mask A in an order of 1→2→...7→8→1→2→..., the mask A1 is completed. When reading is started from number 7 for the mask A, a mask A7 is generated. When n pixels are read out in the mask A in an order of 7→8→1→2→...→7→8→1→2→... the mask A7 is completed. This is also applied to the masks B, C, and D.

In this way, the CPU of the host apparatus selects the number N in each scan and reads out a mask from the position corresponding to the number N, thereby generating a mask to be used. For example, the mask A1 is needed for the first pass. Hence, reading is started from number 1 for the mask A to generate the mask A1. The masks A2 and B1 are needed for the second pass. Hence, reading is started from number 2 for the mask A to generate the mask A2. In addition, reading is started from number 1 for the mask B to generate the mask B1. When the read position (pointer) is selected for each printing region in each scan, the mask pattern to be used can be changed between the printing regions. Since the mask to be used is changed between the printing regions, the mask pattern to be used in each scan also changes naturally.

FIG. 9 shows an example of a mask pattern to be used in the 4-pass printing. The mask pattern shown in FIG. 9 is a random mask pattern in which mask print pixels (black parts) are arrayed at random. The random mask pattern has a size of n (main scanning direction)×m (sub-scanning direction: ink orifice array direction) pixels. The print ratio is 25%. For example, the mask A corresponds to the mask pattern in FIG. 9.

A method of generating a random mask will be described next.

Figure 32:
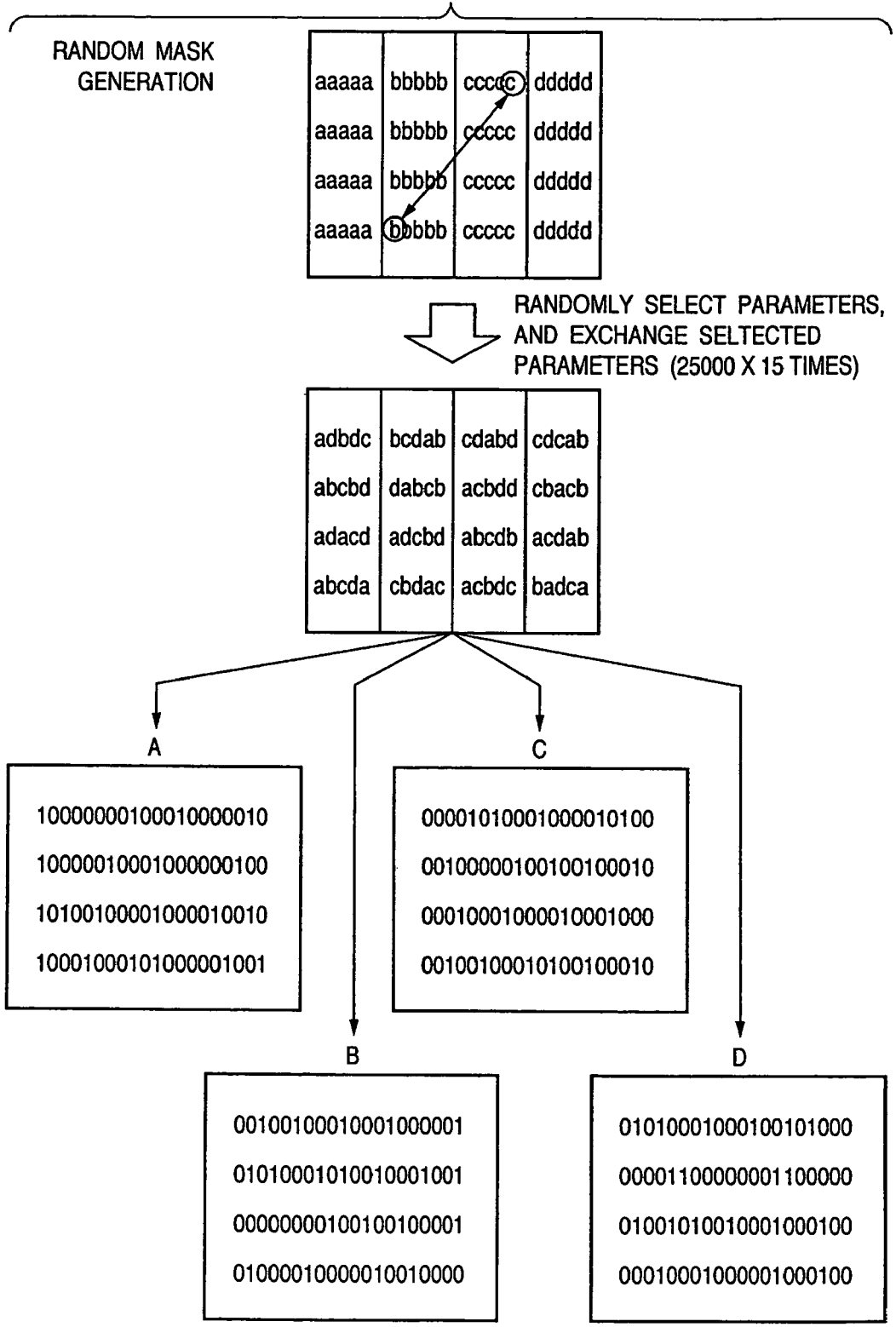
FIG. 32 is a block diagram showing random mask pattern generation.

FIG. 32 is a block diagram showing random mask pattern generation. In this embodiment, 4-pass printing will be described. First, a mask having a size corresponding to n×m pixels is set and filled with four parameters (a, b, c, d) in equal number. Next, these parameters are randomly selected to replace the selected parameters. This processing is executed a plurality of number of times, thereby creating a mask in which the parameters are arrayed at random. The number of replacements may be arbitrary number of times as long as the parameters in the mask are well-randomized. In this embodiment, the number of replacements is 25000×15.

The randomized parameter array is stored in the memory of the host apparatus. The sampling masks AN, BN, CN, and DN are created from it. For example, parameters a, b, c, and d are made to correspond to the masks A, B, C, and D, respectively. Bits are set at only positions where corresponding parameters exist. Since the parameters are arrayed at random, a created mask pattern is a random mask pattern. Since the created random mask patterns are originally from a single mask, these random mask patterns have a complementary relation, thus achieving 100% complement.

According to this embodiment as described above, the type of mask pattern to be used is changed between the unit printing regions. Hence, synchronization between pixel data and a mask pattern can be prevented, and periodical density unevenness can be reduced.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-193078 filed on Jun. 30, 2005, which is hereby incorporated by reference herein in its entirety.

What is claimed is:

1. A printing system comprising a printing apparatus capable of printing an image to a unit area on a printing medium by scanning a printhead over the unit area a plurality of times, and a data supplying apparatus for supplying image data to said printing apparatus, wherein said data supplying apparatus comprises:

generation means for generating thinned image data by applying a mask pattern, corresponding to a plurality of scans over the unit area, to image data to be printed on the unit area;

compression means for compressing the thinned image data generated by said generation means, on the basis of the mask pattern which has been used for generating the thinned image data; and transfer means for transferring, to the printing apparatus, the compressed image data compressed by said compression means and information on the mask pattern which has been used for compressing the thinned image data, and said printing apparatus comprises:

reception means for receiving the compressed image data and the information on the mask pattern transferred by said transfer means; and decompression means for decompressing the thinned image data, on the basis of the information on the mask pattern and the compressed image data received by said reception means.

2. A printing system comprising a printing apparatus capable of printing an image to a plurality of unit areas on a printing medium by scanning a printhead over each of the plurality of unit areas a plurality of times, and a data supplying apparatus for supplying image data to said printing apparatus, wherein said data supplying apparatus comprises:

generation means for generating thinned image data by applying a mask pattern, corresponding to a plurality of scans over each unit area, to image data to be printed on the unit area;

compression means for compressing the thinned image data generated by said generation means, on the basis of the mask pattern which has been used for generating the thinned image data; and transfer means for transferring, to the printing apparatus, the compressed image data compressed by said compression means and information on the mask pattern which has been used for compressing the thinned image data, and said printing apparatus comprises:

reception means for receiving the compressed image data and the information on the mask pattern transferred by said transfer means;

decompression means for decompressing the thinned image data, on the basis of the information on the mask pattern and the compressed image data received by said reception means; and control means for controlling the printhead so that the printhead can print on the unit area based on the thinned image data decompressed by said decompression means, wherein a mask pattern corresponding to the plurality of scans over a first unit area of the plurality of unit areas differs from that corresponding to the plurality of scans over a second unit area of the plurality of unit areas.

3. The system according to claim 1, wherein said data supplying apparatus further comprises:
   quantization means for quantizing multilevel image data; and
   designation means for designating, in accordance with a quantization level of quantized image data quantized by said quantization means, a scanning number of the plurality of scans for each pixel,
   wherein, in a case where thinned image data corresponding to N-th scan out of the plurality of scans is generated, said generation means generates the thinned image data corresponding to the N-th scan by thinning N-th quantized image data designated by said designation means by a mask pattern corresponding to the N-th scan scan.

4. The system according to claim 1, wherein said compression means defines the thinned image data having the same size as a size of the mask pattern corresponding to each scan as a unit of compression, extracts a value of the thinned image data corresponding to a position where a bit is ON in the mask pattern corresponding to each scan, and defines data having the extracted value as the compressed image data.

5. The system according to claim 4, wherein said decompression means decompresses the thinned image data from the compressed image data by setting a value indicating a bit-off at a position corresponding to a position where a bit is OFF in the mask pattern which has been applied for generating the compressed image data and setting a value of the compressed image data at a position where the value indicating the bit-off is not set.

6. A printing apparatus capable of printing an image to a unit area on a printing medium by scanning a printhead over the unit area a plurality of times comprising:
   interface means for connecting to a data supplying apparatus which generates thinned image data by applying a mask pattern, corresponding to a plurality of scans by the printhead over the unit area, to image data to be printed on the unit area, and compresses the thinned image data, based on the mask pattern which has been used for generating the thinned image data;
   reception means for receiving, through said interface means from the data supplying apparatus connected to said printing apparatus, the compressed image data and information on the mask pattern which has been used for generation of the compressed image data;
   decompression means for decompressing the thinned image data, on the basis of the information on the mask pattern and the compressed image data received by said reception means; and
   control means for controlling the printhead so that the printhead can print on the unit area, based on the thinned image data decompressed by said decompression means 7. A printing apparatus capable of printing an image to a plurality of unit areas on a printing medium by scanning a printhead over each of the plurality of unit areas a plurality of times comprising:
   interface means for connecting to a data supplying apparatus which generates thinned image data by applying a mask pattern, corresponding to a plurality of scans by the printhead over each unit area, to image data to be printed on the unit area, and compresses the thinned image data, based on the mask pattern which has been used for generating the thinned image data;
   reception means for receiving, through said interface means from the data supplying apparatus connected to said printing apparatus, the compressed image data and information on the mask pattern which has been used for generating the compressed image data;
   decompression means for decompressing the thinned image data, on the basis of the information on the mask pattern and the compressed image data received by said reception means; and
   control means for controlling the printhead so that the printhead can print on the unit area, based on the thinned image data decompressed by said decompression means,
   wherein a mask pattern corresponding to the plurality of scans over a first unit area of the plurality of unit areas differs from that corresponding to the plurality of scans over a second unit area of the plurality of unit areas.

8. A data supplying apparatus which supplies image data to a printing apparatus capable of printing an image to a unit area on a printing medium by scanning a printhead over the unit area a plurality of times, comprising:
   generation means for generating thinned image data by applying a mask pattern, corresponding a plurality of scans over the unit area, to image data to be printed on the unit area;
   compression means for compressing the thinned image data generated by said generation means, on the basis of the mask pattern which has been used for generating the thinned image data; and
   transfer means for transferring the compressed image data compressed by said compression means and information on the mask pattern which has been used for compressing the thinned image data, to the printing apparatus.

9. A data supplying apparatus which supplies image data to a printing apparatus capable of printing an image to a plurality of unit areas on a printing medium by scanning a printhead over each of the plurality of unit areas a plurality of times, comprising:
   generation means for generating thinned image data by applying a mask pattern, corresponding to a plurality of scans over the unit area, to image data to be printed on each unit area;
   compression means for compressing the thinned image data generated by said generation means, on the basis of the mask pattern which has been used for generating the thinned image data; and
   transfer means for transferring the compressed image data compressed by said compression means and information on the mask pattern which has been used for compressing the thinned image data, to the printing apparatus,
   wherein a mask pattern corresponding to the plurality of scans over a first unit area of the plurality of unit areas differs from that corresponding to the plurality of scans over a second unit area of the plurality of unit areas.

* * * * *